United States Patent [19]

Kawai

[11] Patent Number: 5,717,924
[45] Date of Patent: Feb. 10, 1998

[54] METHOD AND APPARATUS FOR MODIFYING EXISTING RELATIONAL DATABASE SCHEMAS TO REFLECT CHANGES MADE IN A CORRESPONDING OBJECT MODEL

[75] Inventor: Kenji Kawai, Seattle, Wash.

[73] Assignee: Wall Data Incorporated, Kirkland, Wash.

[21] Appl. No.: 499,392

[22] Filed: Jul. 7, 1995

[51] Int. Cl.$^6$ .................................................. G06F 17/30
[52] U.S. Cl. ........................... 395/613; 395/612; 395/614
[58] Field of Search ................................ 395/612, 613, 395/614

[56] References Cited

U.S. PATENT DOCUMENTS

| | | |
|---|---|---|
| 4,930,071 | 5/1990 | Tou et al. ............................ 395/604 |
| 5,212,787 | 5/1993 | Baker et al. ........................ 395/612 |
| 5,263,167 | 11/1993 | Conner, Jr. et al. ............... 395/604 |
| 5,278,946 | 1/1994 | Shimada et al. ................... 395/62 |
| 5,295,256 | 3/1994 | Bapat .................................. 395/500 |
| 5,307,499 | 4/1994 | Yin ...................................... 395/705 |
| 5,418,950 | 5/1995 | Li et al. .............................. 395/604 |
| 5,495,567 | 2/1996 | Iizawa et al. ....................... 395/334 |
| 5,499,371 | 3/1996 | Henninger et al. ................ 395/702 |
| 5,548,749 | 8/1996 | Kroenke et al. ................... 395/613 |
| 5,550,971 | 8/1996 | Brunner et al. .................... 395/603 |

FOREIGN PATENT DOCUMENTS 0 560 543 A2   9/1993   European Pat. Off. .

OTHER PUBLICATIONS

D. R. McClanahan, "Database Design: Relational Rules," *DBMS*, vol. 4, No. 12, Nov. 1991, pp. 54–58.

D. R. McClanahan, "Conceptual Design," *DBMS*, vol. 5, No. 1, Jan. 1992, p. 66(5).

Codd, E. F., "Extending the Database Relational Model to Capture More Meaning," *ACM Transactions on Database Systems*, vol. 4, No. 4, Dec. 1979, pp. 397–434.

G. Decorte et al., "An Object–Oriented Model for Capturing Data Semantics," *IEEE Computer Society Press*, Feb. 1992, pp. 126–135.

M. Hammer and D. McLeod, "Database Description with SDM: A Semantic Database Model," *ACM Transaction On Database Systems*, vol. 6, No. 3, Sep. 1981, pp. 351–386.

D. M. Kroenke, "Developing Object–Oriented Database Applications on Microcomputers," *The Second International Conference on Computers and Applications*, The Computer Society of the IEEE, Jun. 1987, pp. 70–77.

D. M. Kroenke, *Database Processing: Fundamentals, Design, Implementation*, 4th Ed., Macmillan Publishing Company, 1992, Chapters 5 and 7, pp. 123–167 and pp. 205–252.

D. Keim et al., "Object–Oriented Querying of Existing Relational Database," *Databases and Expert Systems Application*, 4th International Conference, Sep. 6–8, 1993, pp. 326–336.

F. Leymann, "UDH: A Universal Relation System," *Data & Knowledge Engineering* vol. 5, (1990) pp. 21–38.

(List continued on next page.)

*Primary Examiner*—John C. Loomis
*Attorney, Agent, or Firm*—Christensen, O'Connor, Johnson & Kindness PLLC

[57] ABSTRACT

An object model comprises one or more semantic objects that represent items about which data is stored in a relational database in a computer system. Each semantic object has one or more components that define the data stored for each item. The object model is mapped into a current relational database schema. As a user makes changes to the model the computer system generates a proposed relational database schema, and the differences between the current relational database schema and the proposed relational database schema are determined. The relation database is modified to reflect changes made in the corresponding object model based upon the differences between the current and proposed relational database schemas.

15 Claims, 30 Drawing Sheets

OTHER PUBLICATIONS

"Visual Representation of Database Query Definition," *IBM Technical Disclosure Bulletin*, vol. 33, No. 9 Feb. 1991, pp. 238–242.

International Search Report dated Jan. 31, 1995.

S. Dewitz and M. Olson, "Semantic Object Modeling with SALSA," Mitchell McGraw-Hill Publishing Company, 1994.

Blaha et al., "Relational Database Design Using An Object-Oriented Methodology," *Communications of the ACM*, vol. 31, No. 4 Apr. 1988, pp. 414–427.

Lejter et al., "Support for Maintaining Object-Oriented Programs," *IEEE Transactions on Software Engineering*, vol. 18, Dec. 1992, pp. 1045–1052.

PRIMARY KEY = NAME
NAME_1 IS FOREIGN KEY TO NAME OF SECRETARY

|   | SECRETARY | | | |
|---|---|---|---|---|
| NAME | ADDRESS | SALARY | WPM | |
|  |  |  |  |  |
|  |  |  |  |  |
|  |  |  |  |  |
|  |  |  |  |  |
|  |  |  |  |  |

PRIMARY KEY = NAME

PRIMARY KEY = SURROGATE KEY
STUDENT_ID IS FOREIGN KEY TO STUDENT_ID OF STUDENT

PRIMARY KEY = NAME
STUDENT_ID IS FOREIGN KEY TO STUDENT_ID OF STUDENT

PRIMARY KEY = STUDENT_ID
NAME_1 IS FOREIGN KEY TO NAME OF PROFESSOR

METHOD AND APPARATUS FOR MODIFYING EXISTING RELATIONAL DATABASE SCHEMAS TO REFLECT CHANGES MADE IN A CORRESPONDING OBJECT MODEL

FIELD OF THE INVENTION

The present invention relates to computer systems in general, and in particular to computer systems that store and retrieve information using a relational database.

BACKGROUND OF THE INVENTION

At some point in time, most computer users have the need to store and retrieve some sort of information. Typically, this is accomplished using any one of numerous, commercially available database programs. These programs allow a user to define the types of information to be stored in the database, as well as provide forms for users who will enter data into the database and print reports for people wishing to retrieve previously stored information.

One of the most popular types of databases is referred to as a relational database. In a relational database, data are stored in rows of a two-dimensional table. Each table has one or more columns that define the types of data that are stored. Traditionally, it has been difficult for novice or unsophisticated users to create the relational database tables (also referred to as a database schema) in a way that accurately mirrors the user's idea of how the data should be arranged and stored.

A new approach for allowing users to create relational database schemas is a computer program called SALSA™ being developed by Wall Data Incorporated of Seattle, Wash. This program allows users to create a model of the data to be stored on the database. The model consists of one or more semantic objects that represent a complete item such as a person, an order, a company, or anything else that a user might think of in terms of being a unique entity that will be stored in the database. Each semantic object has one or more attributes that store identifying information about the semantic object, as well as object links that define relationships between two or more semantic objects. Once the user has completed the semantic object model, the SALSA computer program analyzes the model and creates a corresponding relational database schema that can store data in the computer. The details of the SALSA semantic object modeling and schema generating system are set forth in commonly assigned, copending U.S. patent application Ser. No. 08/145,997, filed Oct. 29, 1993, now U.S. Pat. No. 5,548,749 which is hereby incorporated by reference.

In most real world database applications, the types of data required to be stored in the database change over time. Information thought to be important when the relational schema was created turns out to be of little value to a user. Other more important information is left out of the database and needs to be added. Currently, them are no commercially available computer programs that will allow a user to easily modify a relational database schema to remove information, add information, or change relationships between information in the database. Therefore, to modify a database schema, it is often necessary to define a completely new schema and use a translation program that will fill in the new relational database schema with data that have been previously stored in the database. Typically, the database schema must be updated by users who are experts in the field of database modeling. This is not only time-consuming and potentially expensive, but also frustrating for users who only wish to store data in the database and are not concerned with the inner workings of a database management system.

In light of the problems with current database technology, them is a need for a computer system that will allow a user to modify an existing relational database schema. The system should be intuitive and easy to learn while allowing the user to implement complicated schema modifications that previously required the aid of a database modeling expert.

SUMMARY OF THE INVENTION

The present invention is a computer system for modifying an existing database schema to reflect changes made in a corresponding object model. The object model includes one or more objects, each of which contains one or more components that describe the objects. The object model is related to a relational database schema that is stored within the memory of the computer system.

As the user makes modifications to the object model, the computer system generates a proposed schema. The proposed schema is compared to a current schema that defines the existing database. Changes between the current and proposed schema are detected and are combined into a list of changes that must be made for each table in the database. The order in which the tables are modified is selected so that tables referenced by other tables are modified before the referencing tables.

The computer system further determines whether a column of a table within the database includes data that is to be moved to another table in the database. When a column containing data is to be deleted, a search is performed for a similar column that is to be added to another table in the database. Once a table to receive the data is found, the computer system updates the database by moving the data to the appropriate table.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

To solve the problems associated with the inability of prior art database management systems to allow users to easily modify a relational database, the present invention is a computer system that is programmed to update a relational database schema to reflect changes made in a corresponding object model.

Figure 1:
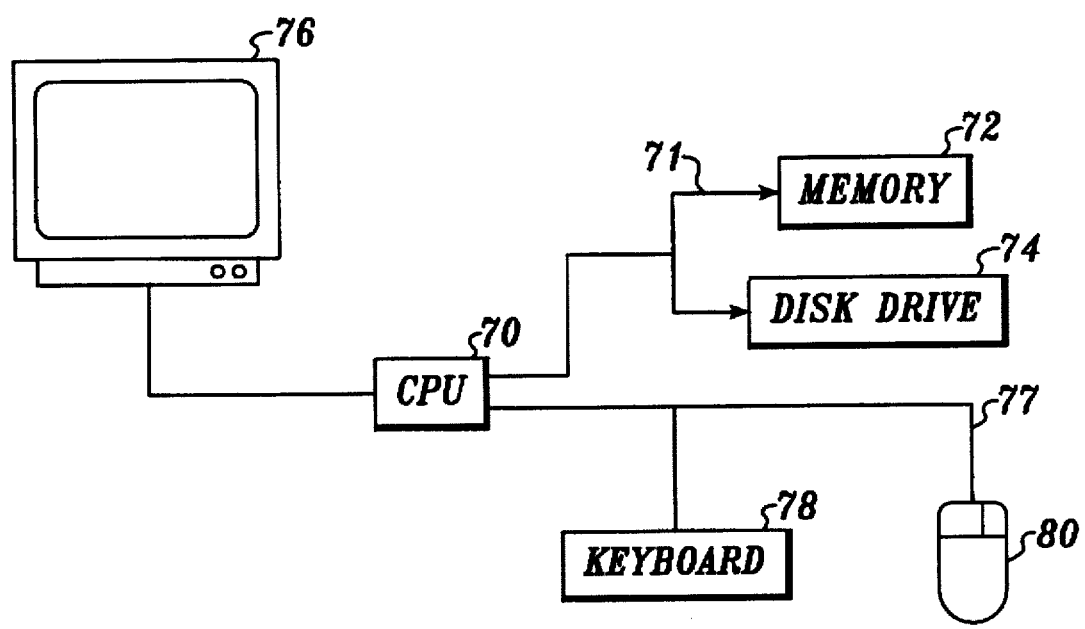
FIG. 1 is a block diagram of a computer system according to the present invention that allows a user to modify an existing relational database schema.

Turning now to FIG. 1, a block diagram of a computer system for implementing the present invention is shown. The computer system generally comprises a central processing unit (CPU) 70 having internal memory 72 and a permanent storage means such as a disk drive 74. A monitor or display 76 is coupled to the CPU 70 to allow the user to see an object model that represents data to be stored in a relational database that exists within the internal memory 72 and eventually on the disk drive 74. The user creates the object model using a keyboard 78 and a pointing device such as a mouse 80. After the object model has been created, a computer program causes the CPU to analyze the model and create a corresponding relational database schema within the memory 72. As will be described below, changes made to the object model are analyzed and the database schema stored in the memory is modified to reflect the changes made.

As is fully set forth in the '997 patent application, the SALSA computer program provides a simple means by which users can create relational database tables without having to understand such relational database concepts as tables, attributes, intersection tables, foreign keys, surrogate keys, etc.

In the SALSA program, semantic objects are used to represent items for which data is stored in a relational database. Each semantic object is defined by the attributes it contains. Simple value attributes represent simple characteristics of an item such as a person's name, age, occupation, etc. Group attributes collectively define a characteristic of the object represented by the semantic object. An address is an example of a group attribute because is includes a street, house number, city and state that collectively defines where a person lives. Object link attributes define relationships between semantic objects in the object model.

In the '997 patent application, a semantic object was defined as including one or more attributes. These attributes may be simple values, groups or object link attributes. In contrast with the '997 patent, the attributes of a semantic object are now referred to as components, and a semantic object is simply referred to as an object. However, for the purpose of the previously filed application and the present specification, the term object shall be synonymous with the term semantic object, and the term component shall be synonymous with the term attribute.

Although the semantic object modeling system described in the '997 patent application allows a user to create a database schema, no means are provided by which a user can modify an existing schema to reflect a change made to the corresponding object model. In the present invention, the changes that a user may make to the object model can be divided into four categories. These categories are: changes to an object within the model; changes to a component within an object; changes to a property of a component; or changes to the relationships between objects in the model. For each change that occurs in the object model, there must be a corresponding change made in a table of the relational database.

TABLE 1 sets forth the changes that a user can make to an object within the object model and the corresponding changes that are made to a database schema in order to implement the model change.

TABLE 1

| Object Model Changes | Database Schema Change |
| --- | --- |
| Create new object | Create new table |
| Delete object | Drop table |
| Change object name | Change table name |

As described in the '997 patent application, each object in the object model is paired with a corresponding relational database table that exists within the memory of the computer system. Each table typically has the same name as its corresponding object. If the user adds an object to the model, a new relational database table must be added to the database schema. Similarly, if an object is deleted from the model then its corresponding database table is deleted from the schema. Finally, if the user changes the name of an object then the name of the corresponding relational database table is changed accordingly.

The second type of change that a user may make to a database is to modify the components within an object. TABLE 2 lists the changes that a user may make to a component and the corresponding changes that are made within a table of the relational database.

TABLE 2

| Component Changes | Database Schema Changes |
| --- | --- |
| Add single-valued, simple-value or group component | Add new column(s) |
| Delete single-valued,simple-value or group component | Drop column(s) |
| Add multi-valued, simple-value or group component | Create new table |
| Delete multi-valued, simple-value or group component | Drop table |
| Add single-valued object-link component | Add new column(s), define as foreign key |
| Delete singl-valued object-link component | Drop foreign key column(s) |
| Add multi-valued, object-link component | Create new intersection table in many-to-many relationship; or add new column(s) as foreign key |
| Delete multi-valued, object-link component | Drop intersection table or foreign key column(s) |
| Add parent-type component | Add new column(s), define as foreign key |
| Drop parent-type component | Delete foreign keys |
| Add/delete subtype-group component | No changes |

FIGS. 2–8 show diagrammatically the changes that can be made to the components within an object and the corresponding changes that are made to a database schema. As will be appreciated, the object model is modified on the display screen of the computer system and the database schema changes are carried out in internal memory of the computer system.

Figure 2:
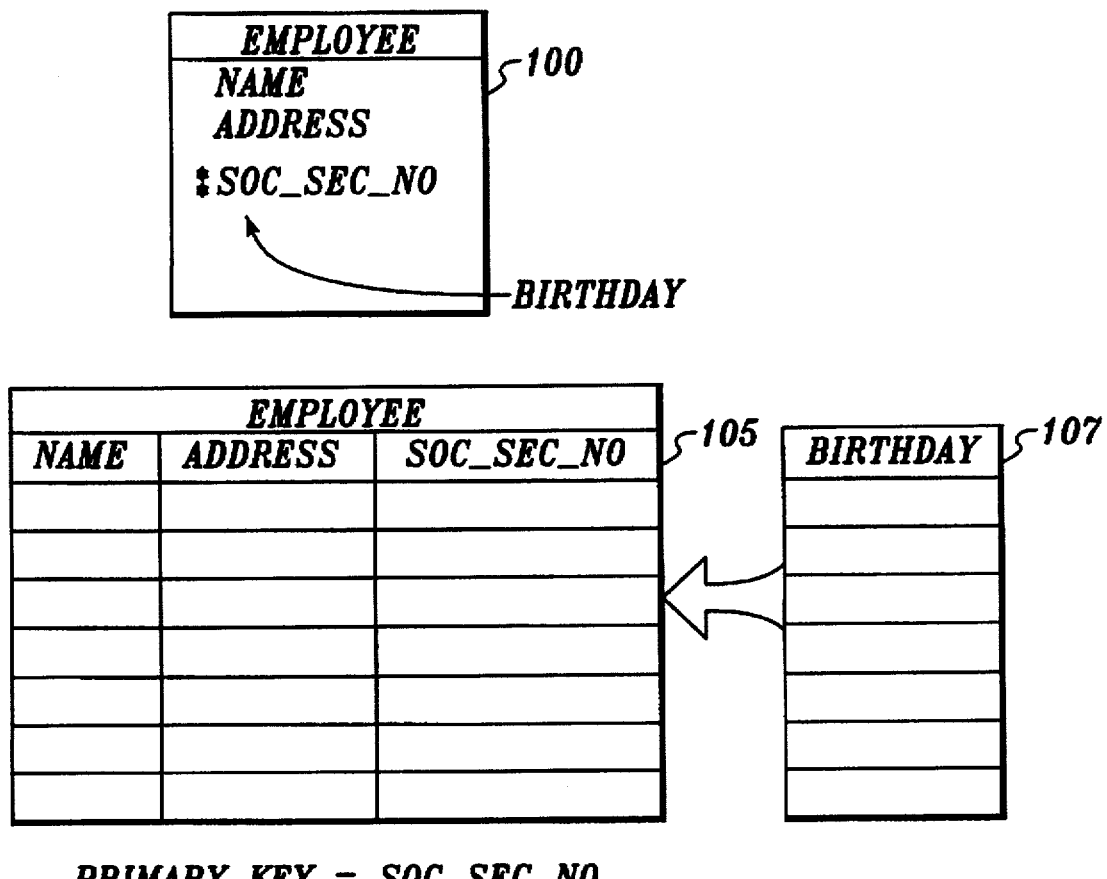
FIGS. 2–8 are diagrammatic representations of how a relational database is modified to reflect a change in a corresponding object model.

FIG. 2 shows the changes made to a relational database table when a user adds a single-valued, simple value or group component to an object. Here an object 100 represents an employee. The object includes three simple value components: "Name," "Address," and "Soc_Sec_No." Components that uniquely identify an instance of the employee object stored in the database are indicated by a pair of asterisks to the left of the component name.

As set forth in the '977 patent application, the employee object 100 is represented within the database as a relational table 105. The name of the table matches the name of the object 100. The table has three columns: Name, Address and Soc_Sec_No. The social security number column within the employee table is selected as the primary key of the table to reference a unique employee. The database maintains a record of the column(s) that define the primary key of the table. Additionally, most databases keep a record of whether a column is a foreign key to another table in the database.

When a user adds a new, single-valued, simple value component to an object the corresponding relational table 105 must be updated. Here, the user is adding a component labeled "Birthday" representing an employee's birthday to the employee object. The component is single-valued because it is assumed that an employee can have only one birthday. To store this information in the database, a column 107 is added to the employee table 105. The column 107 has the same name as the component added. The column 107 is defined to hold data of the type defined by the birthday component, i.e., a date.

As will be appreciated, if a user removes a single-valued component from the object, then the corresponding column will be removed from the table. If the user removes a single-valued component that uniquely identifies an instance of the object, such as the component labeled "Soc_Sec_No," the primary key of the table will also be removed. In that case, a column of surrogate keys (not shown) is generated and added to the table.

Figure 3:
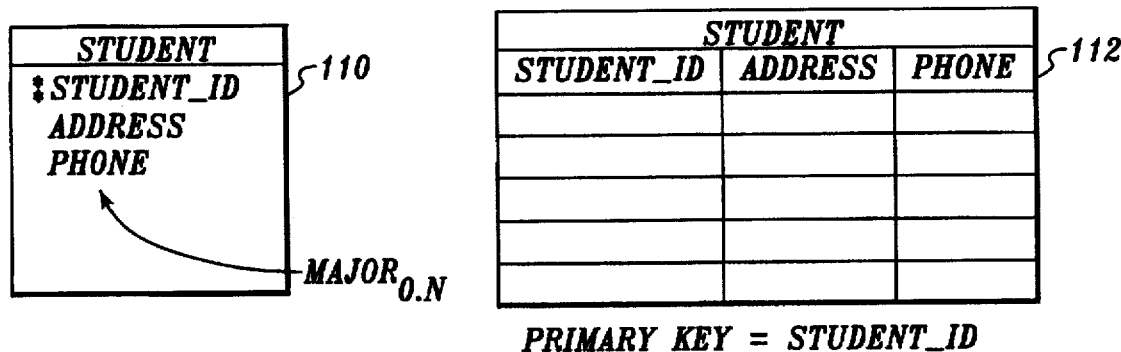

The effect of adding a multi-valued component to an object is shown in FIG. 3. An object 110, representing a student, includes three simple value components: "Student_id," "Address," and "Phone." The Student object 110 is associated with a corresponding relational database table 112 having three columns corresponding to each of the three components within the object. In the example shown in FIG. 3, a user is adding a multi-valued, simple value component labeled "Major $_{0,N}$" to the Student object 110. The component is shown on the screen as having a minimum cardinality of zero, indicating that a student may not have declared any major and a maximum cardinality of N, indicating that a student may have more than one major.

Multi-valued components are stored in separate tables within the relational database. Therefore, the addition of the multi-valued component "Major$_{0,N}$," to the Student object 110 will cause a table 114 to be created. The table 114 has the same name as the component being added. The table has three columns: a first column holds a surrogate primary key, a second column stores the student's major, and a third column stores a foreign key to the student table 112. In particular, the primary key (i.e., those values stored in the column labeled Student_id) of the student table 112 is used as a foreign key in the table 114 thereby providing a mechanism for searching the table 114 to determine each student associated with a particular major and a way of searching the table 112 to determine each student's major(s).

If a user removes a multi-valued, simple-value component from an object, the corresponding table 114 is deleted from the database.

Figure 4:
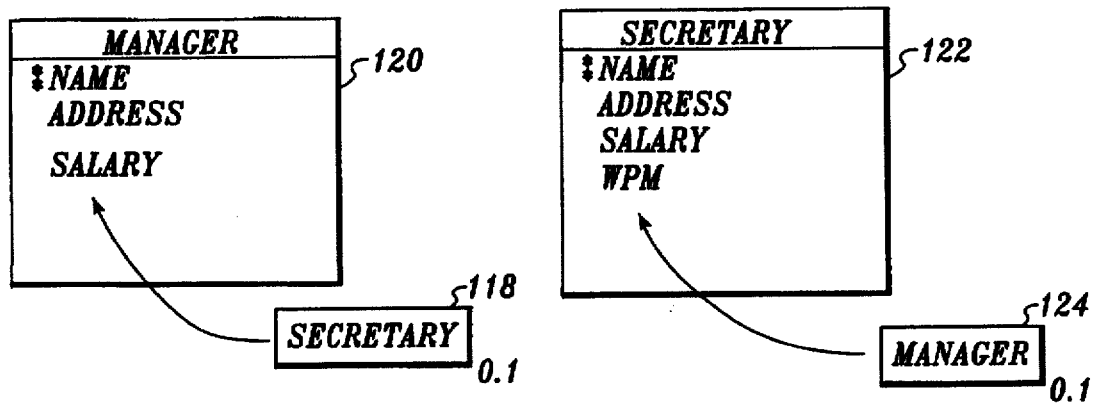
Figure 4:
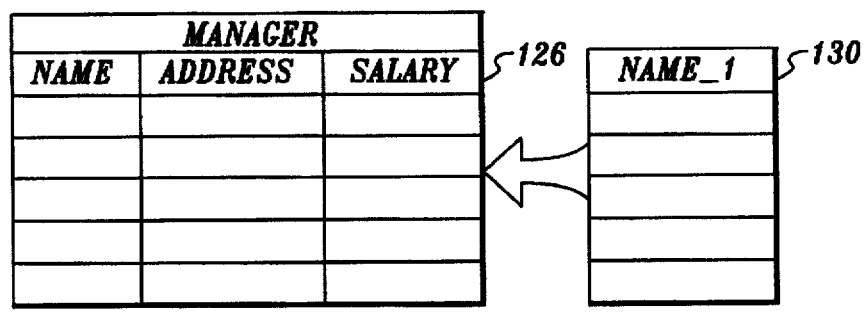

The changes that take place in the relational database schema when a user adds a single-valued, object link component to an object within the object model are shown in FIG. 4. Here, the object model includes an object 120 representing a manager and an object 122 representing a secretary. Adding an object link component 118 to the Manager object 120 defines a relationship between a manager and a secretary. The object link component 118 has a minimum cardinality of zero, indicating that a manager need not have a secretary, and a maximum cardinality of one, indicating that a manager can have, at most, one secretary. Placing the object link component 118 in the Manager object 120 automatically causes a corresponding object link 124 to be generated and added to the Secretary object 122.

A table 126 represents the Manager object 120 in the relational database. The table includes three columns to store a manager's name, salary, and address. A table 128 is used to represent the Secretary object. The table 128 includes at least four columns that store the name, address, and salary of a particular secretary. Additionally, the table 128 includes a column, labeled "Wpm," to store the number of words per minute a secretary can type.

The addition of the single-valued, object link component 118 to the Manager object 120 causes a column 130 to be added to the table 126. The column 130 is labeled "Name_1" to differentiate it from the column labeled "Name." The column 130 holds a foreign key to the relational table 128. As indicated above, the foreign key selected is defined to reference the primary key (i.e., Name) for the corresponding table.

The addition of the column 130 to the table 126 allows a database management system to search the tables in order to determine which manager is associated with a particular secretary and vice versa. It should be noted that for one-to-one relationships, the foreign key may be added to either table. For consistency, the present invention always adds the foreign key to the table corresponding to the semantic object in which a user has first placed an object link component, if symmetric, or having a required link, or having an object link in a single-valued group component.

The deletion of the object link component 118 from the Manager object 120 or the object link component 124 from the Secretary object 122 causes the foreign key column 130 to be removed from the relational table 126.

Figure 5:
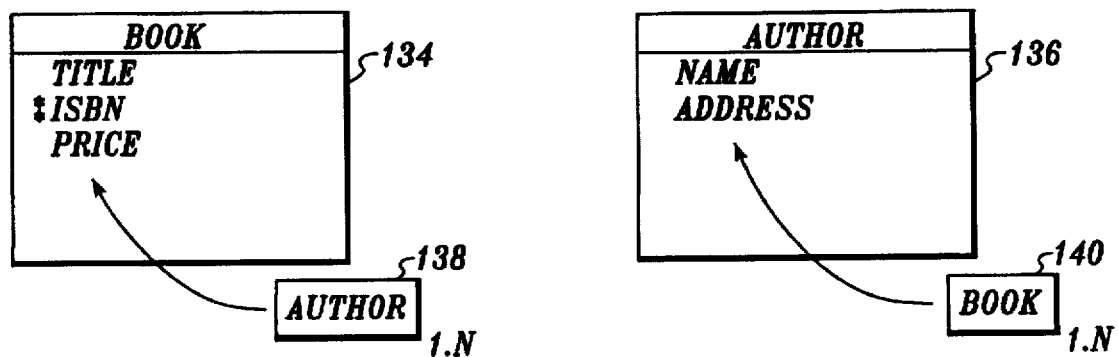

In contrast to the object model modification shown in FIG. 4, FIG. 5 shows the changes made to a relational database when a user adds a multi-valued, object link component to an object. Here, an object model includes an object 134 that represents a book and an object 136 representing an author. The addition of a multi-valued, object link component 138 to the Book object 134 indicates that a book may have multiple authors and an author may have written several books. When the multi-valued object link component 138 is added to the object 134, a corresponding multi-valued, object link component 140 is automatically created and placed in the Author object 136.

To represent the Book object, a corresponding relational table 144 is created in the database. The table has three columns corresponding to each of the three components within the book object 134. A relational table 146 corresponds to the Author object 136. Because none of the components within the Author object 136 uniquely identify a particular author, the table 146 includes a column of surrogate keys. The surrogate key column is the primary key for the table 146.

The addition of the multi-valued object link component 138 within the object 134 causes an intersection table 148 to be created. The intersection table includes two columns holding the primary keys of the table 144 and the table 146. The intersection table 148 allows the database management system to determine the author(s) for any book in the database and to determine which books a particular author has written.

The deletion of the multi-valued object link component 138 from the Book object 134 causes the intersection table 148 to be deleted from the database schema.

Figure 6:
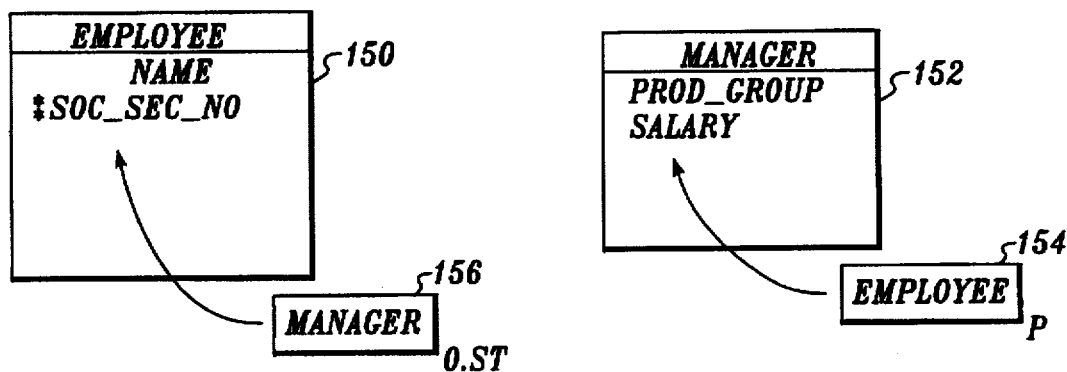

FIG. 6 shows how a database is modified when a user creates a parent/subtype relationship between two objects in the object model. For example, if a user has an object 150 representing an employee and an object 152 representing a manager, the user can indicate that a manager "is an" employee by placing a parent type, object link component 154 within the manager object 152. Parent type object link components are indicated by a "P" subscript at the lower right hand side of the component name. Placing the parent type object link component 154 within the Manager object 152 automatically causes the creation and insertion of a corresponding subtype object link component 156 to be placed in the Employee object 150.

To represent the Employee object 150 within the a relational database, a relational table 158 is created having two columns that store values for both of the components of the Employee object 150. To represent the Manager object, a relational table 160 is created having two columns that store values for each of the components within the Manager object, as well as a surrogate key column that acts as a primary key for the table. The addition of the parent-type object link component 154 to the Manager object 152 is represented in the database by adding a column 162 to the table 160. The column 162 contains a foreign key for the table 158. As indicated above, the foreign key selected is preferably the primary key for the corresponding Employee table 158.

The deletion of a parent type object link component from the Manager object 152 causes the column 162 to be removed from the table 160.

In addition to changing the components within an object, the user may also make changes to a component property. As described in the '977 patent application, properties define allowable values that can be stored in a column of the database. TABLE 3 shows the changes that can be made to a property of component within an object and the corresponding changes that take place in the database.

TABLE 3

| Component Change | Corresponding Database Schema Change |
| --- | --- |
| Change component name | Change table or column name |
| Change maximum cardinality of component from one to many | Drop column, create new table with foreign key and surrogate key |
| Change maximum cardinality of component from many to one | Drop table and foreign key; add new column |
| Change maximum cardinality of object | Creates foreign key in related |

TABLE 3-continued

| Component Change | Corresponding Database Schema Change |
| --- | --- |
| link component from one to many | table if one-to-many, or creates intersection table if many-to-many |
| Change minimum cardinality of component | Change NULL constraint |
| Change ID status (i.e., uniqueness) of component | Change UNIQUE constraint |
| Change value type of simple-value component | Change data type |
| Change default value of component | Change default value |

As can be seen from TABLE 3, many of the changes that a user may make to component properties involve the simple redefinition of a column or data type stored in a column of a relational table. However, some component changes require the addition or deletion of a table and/or column.

Figure 7:
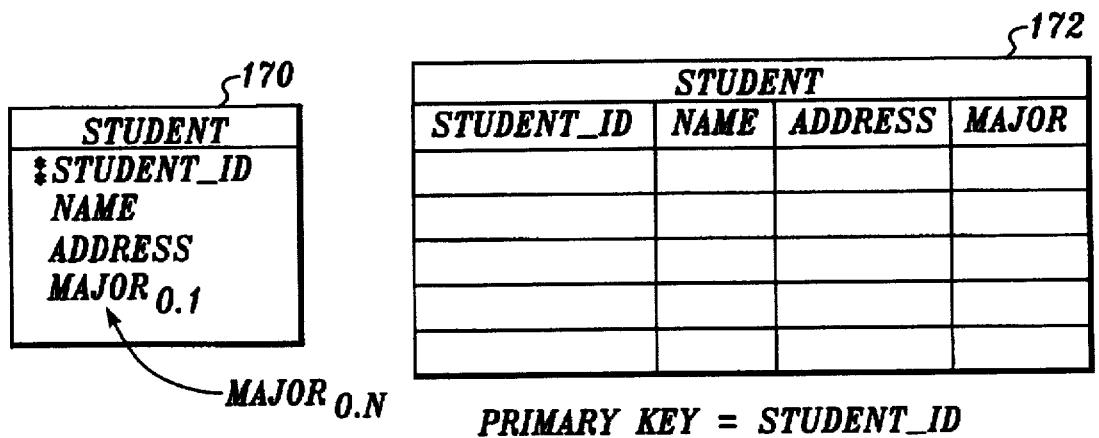
Figure 7:
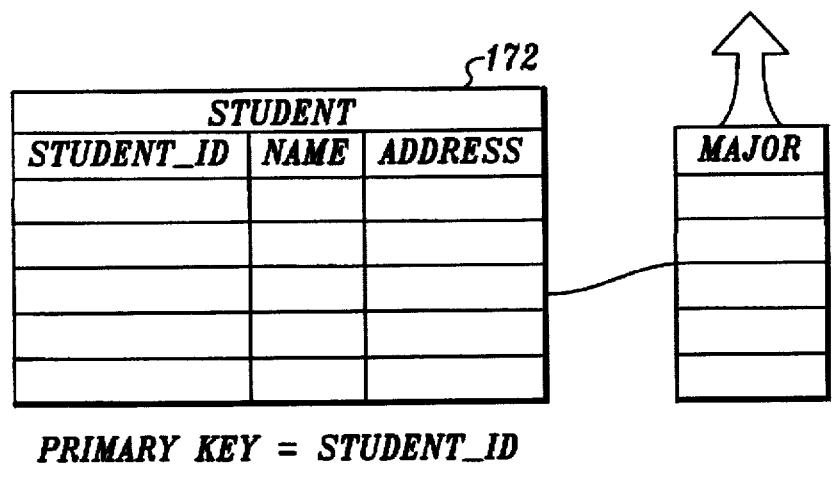

FIG. 7 shows a database change when a user redefines a single-valued, simple value component as a multi-valued component. Here, an object model includes an object 170 that represents a student. The object 170 has four components labeled "Student_id," "Name," "Address," and "$Major_{0,1}$". The minimum cardinality of the Major component is zero, indicating that a student may not have declared a major. The maximum cardinality of the Major component is one, indicating that a student has at most one major. To store data about a student within the database, a relational table 172 is created within the computer memory. The table has at least four columns representing each of the components within the student object.

If a user changes the maximum cardinality of the Major component from one to N, thereby indicating that a student may have more than one major, the table 172 is reformatted. In particular, the column labeled "Major" is removed from the table 172 and a new table 176 is created to store multiple entries of a student's major. The table 176 includes three columns; one column stores a student's major such as "English," "History," "Math," etc., and the second holds a foreign key to the Student table 172. The last column holds a surrogate key that is a primary key of the table 176.

A change of a maximum cardinality of the Major component from N to one is implemented in the database as the reverse process of that shown in FIG. 7.

Figure 8:
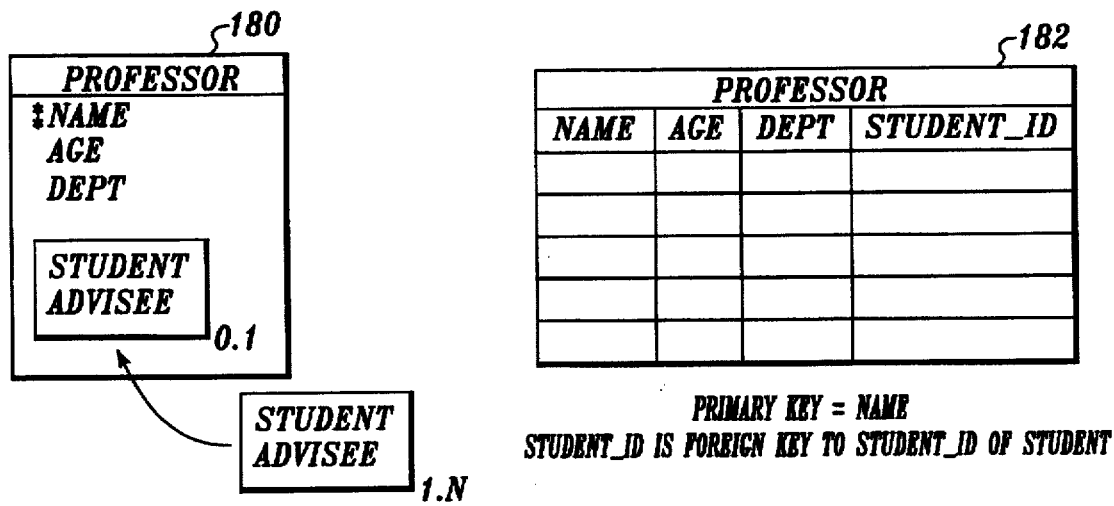
Figure 8:
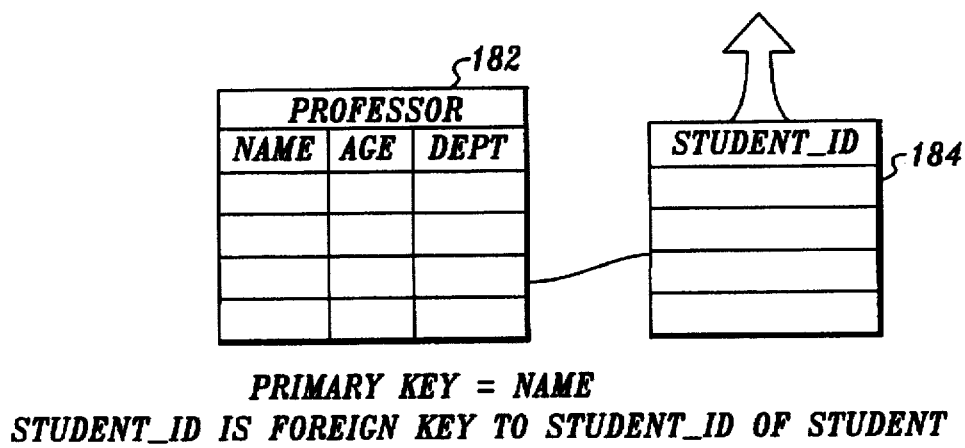
Figure 8:
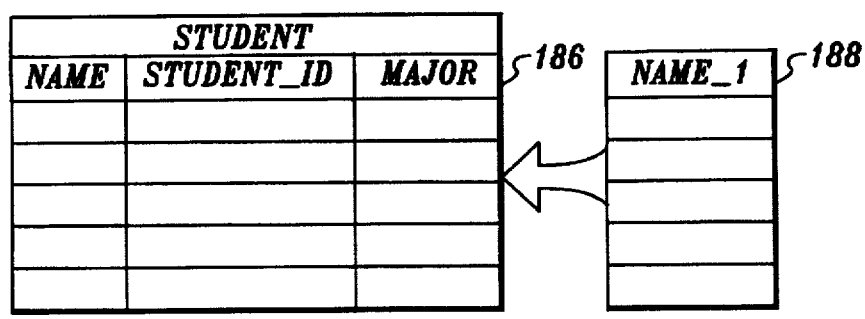

FIG. 8 shows the database change that takes place when a user changes the maximum cardinality of an object link component from one to N. In the object model shown, an object 180 represents a professor in a university. The professor object has three components labeled "Name," "Age," and "Department" that represent data stored about a professor. Additionally, there is an object link component labeled "Student Advisee" that links a professor to a Student object (not shown), thereby representing the fact that a professor is an advisor of a student. The minimum cardinality of the object link component is zero, indicating that a professor may have no student advisees. The maximum cardinality of the Student Advisee object link attribute is one, indicating that a professor has, at most, one student advisee.

To represent the Professor object within the database, a relational table 182 is created having three columns that correspond to the three components in the professor object. Additionally, the table 182 includes a column that holds a foreign key from a corresponding student table 186.

When the maximum cardinality of the Student Advisee object link attribute is changed from one to N, to indicate that a professor may have multiple advisees, the foreign key column 184 of the relational table 182 is removed. A column 188 holding a foreign key from the relational table 182 is then added to a relational table 186 that stores data about a student.

In a case where both objects have multi-valued links to each other, an intersection table is created having foreign keys to the two object tables.

The last type of object model change that can be made by a user is to change a table constraint. Although this is not explicitly shown on the object model, the user may change which column of a table is selected as the primary key. TABLE 4 sets forth the corresponding changes that must be made when a user changes the primary keys of a table.

TABLE 4

| Table Constraint | Corresponding Table Change |
|---|---|
| Change primary key | Change primary key and update corresponding foreign keys |
| Change primary key type (data/surrogate) | Change primary key and update corresponding foreign keys and/or drop surrogate key |

Changes to a primary key within a table are made by redefining a column within a relational database table as well as the corresponding foreign key columns of any related tables.

To determine how a database schema within the computer memory or stored on a permanent storage media should be updated, it is necessary to compare a proposed relational database schema corresponding to the object model, as modified by a user, with a previously stored definition of the current database schema. The differences between the two schema are determined and the existing relational database is modified accordingly.

To store a representation of the proposed and current schemas, the present invention creates a data structure that is stored within the internal memory of the computer as well as on the computer's permanent storage means. The data structure includes a definition of each table in the database as well as definitions of each of the columns within the table. The data structure for the proposed schema is completed as the object model is being analyzed to create the relational database schema.

In the preferred embodiment of the invention, the data structure used to store a representation of the current schema is made up of instances of the following C++ classes. However, those skilled in the art of computer programming will recognize that other data structures could be used to store the schema definition. Additionally, other programming languages could be used. It should be noted that the class definitions provided below only include the relevant member variables for a class. The member functions of the classes are not explicitly shown but are evident from the description of the invention described below and shown in the accompanying flowcharts.

```
class Schema
{
tableList;        // List of all tables corresponding to each object in
                  object
                  // model
};
```

The Schema class includes a list of table definitions that correspond to each of the objects in the object model. Tables created to hold instances of multi-valued components and intersection tables are not included in the list. Each element within the list of tables includes a complete definition for the corresponding relational database table.

Instances of the following TableDef class are used to store the definition of each table within the database schema.

```
class TableDef
{
table_Id;         // unique number assigned to the database table
columnList;       // List of column entries in this table (of type
                  DataColumn,
                  // KeyColumn, GroupColumn, or
                  // ForeignKey)
*parentTable;     // Pointer to parent table if applicable
tableList;        // List of child tables belonging to this table
relationList;     // List of relations to other tables
indexList;        // List of indices defined for this table
primaryKeyType;   // User specification for TableKeyType
primaryKey;       // Index defined as primary key
tableName;        // Original name, may be same as object name
newTableName;     // Actual table name used within the database
tableType;        // Explicit table type (i.e. object, multi-valued
                  component
                  // or intersection)
hDBObject;        // Handle to corresponding object in object model
};
```

As can be seen, the TableDef class includes member variables that store information on the columns within a table, a pointer to a parent table if applicable, any child tables that belong to the table as well as relationships between tables. Furthermore, the primary key(s) and key type for the table are specified.

Information concerning each column within a relational table are stored as instances of the classes DataColumn, KeyColumn, GroupColumn or ForeignKey. All these classes are related to a common base class, ColumnDef; defined below.

```
class ColumnDef   // Base class to store info on each column in database
{
Col_Id;           // Unique number assigned to each column in
                  database
nullAllowed;      // TRUE-optional, FALSE-required
idStatus;         // Uniqueness: non-unique, unique or primary key
columnName;       // Column name assigned in database
hDBProp;          // Handle to corresponding object component in the
                  // model
colType;          // Data Column, Key Column, Group Column or
                  Foreign
                  // Key
};
```

No instances of this class are actually created. Rather the class is only used to store the common member variables of the following derived classes.

```
class DataColumn: public ColumnDef
{
valueType;        // Data type specified in the corresponding object
                  // model
dataType;         // Data type declared in the database
logicalLength;    // Data length specified in the model when applicable
dataLength;       // Data length declared in the database when
                  applicable
scale;            // Precision length declared in the database when
                  // applicable
};
```

Instances of the DataColumn class store information on any column that holds data within relational database table.

If a column is defined as a member of a foreign key of a table, information concerning the column is stored as an instance of the following class.

```
class KeyColumn: public DataColumn
{
*pRefColumn;     // Pointer to a corresponding column in table referenced
                 // by parent foreign key
};
```

Because most database programs do not recognize column groups within a relational table, information concerning columns that are logically organized as a group are stored as instances as of the following class:

```
class GroupColumn : public ColumnDef
{
columnList;      // List of column members within a group
                 // (may be of type DataColumn, GroupColumn or
                 // ForeignKey)
};
```

Finally, information concerning any foreign key relations within a table are stored as instances of the following class. Foreign keys are derived from the GroupColumn class because a foreign key of a table may comprise more than a single column. However, members of the columnList for foreign keys are restricted to instances of the KeyColumn class.

```
class ForeignKey: public GroupColumn
{
*pReferenceTable;   // pointer to the table where the foreign key
                    // originated
};
```

Instances of the classes described above are created and initialized as the object model is analyzed to define a proposed database schema.

The database schema stored in the data structure described above corresponds to the object model as modified by the user. The proposed schema is compared to the database schema that describes the database as it exists in the computer memory. For the purposes of the present specification, the previous definition of the database is referred to as the current schema. The data structure describing the current schema is stored in the computer memory or on the computer's permanent storage means. After the user completes a series of changes to the object model, the data structure for the current schema is recalled into memory from the permanent storage and compared to the data structure that defines the proposed schema.

Turning now to FIGS. 9A-9F, the steps performed by the computer system of the present invention to compare two database schemas are shown. As indicated above, each schema is stored as a data structure that defines the tables in a database, the columns within each table, and any keys (primary or foreign) within a table.

Beginning at a step 200, the computer system recalls the proposed schema data structure and current schema data structure and places these data structures within the internal memory of the computer. At a step 204, the computer begins a loop wherein each table listed in the tableList for the current schema is compared to an entry in the corresponding tableList of the proposed schema. At a step 208, it is determined whether the table in the current schema has an empty list of child tables. If not, the table comparison routine to be described is called for each table in the table's list of child tables. This recursive operation takes place until a table is found having an empty tableList.

At a step 214, the schema comparison routine determines whether the table in the current schema is found in the proposed schema. If not, the user must have deleted the object or multi-valued component from the object model and the table is deleted from the relational database at a step 218.

If the table is found in the proposed schema, the comparison routine begins a loop that analyzes each column in the columnList defined for a particular table at a step 216. At step 220, it is determined whether the column is of type GroupColumn. If so, the comparison routine at step 216 is called for each column in the columnList that keeps track of the columns that make up a group. The recursive operation at step 224 takes place until all columns within a group are processed.

Figure 9A:
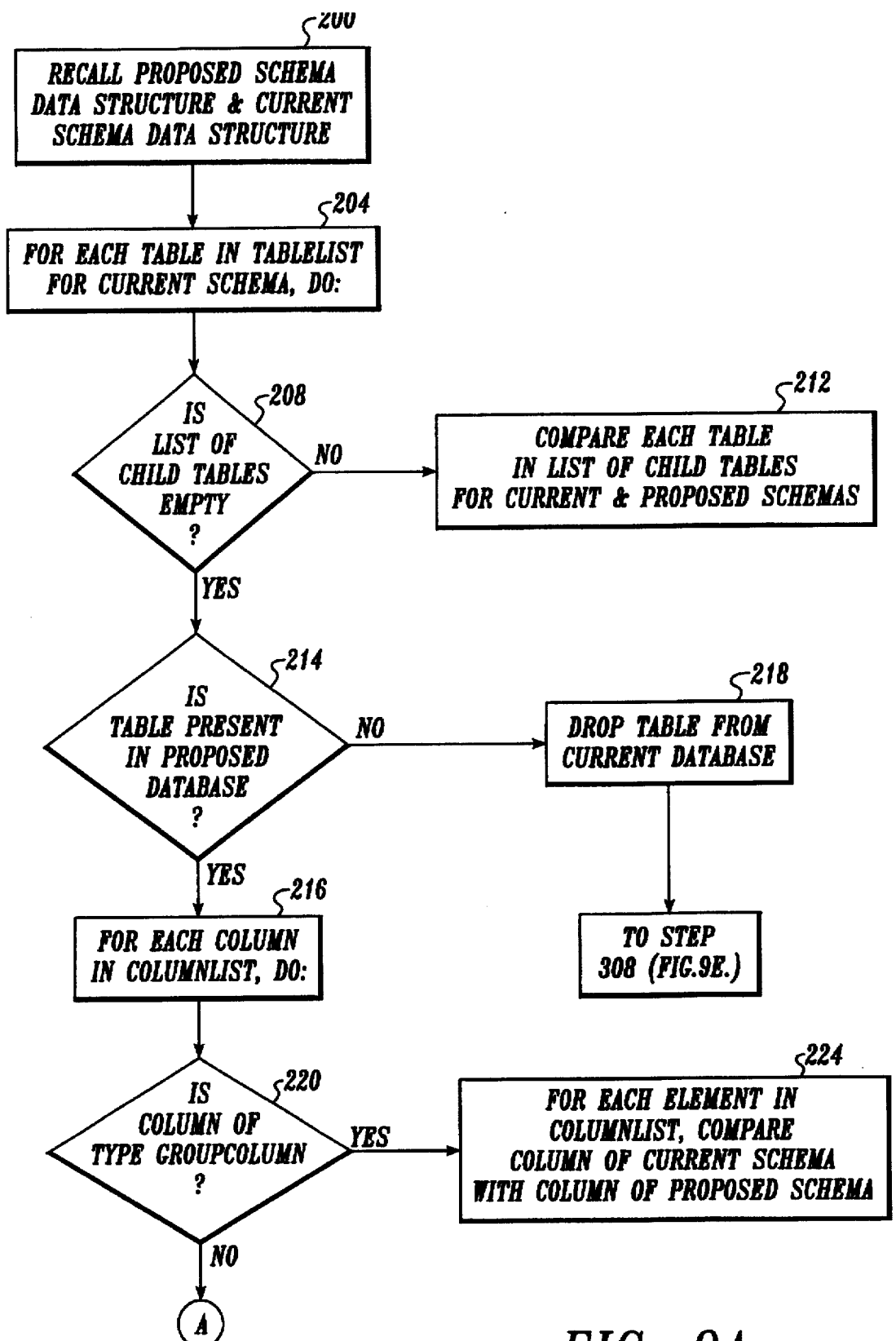
FIGS. 9A–9F are a series of flow charts showing the steps performed by the computer system of the present invention to compare two relational database schemas in order to update an existing relational database to reflect changes made in a corresponding object model.
Figure 9B:
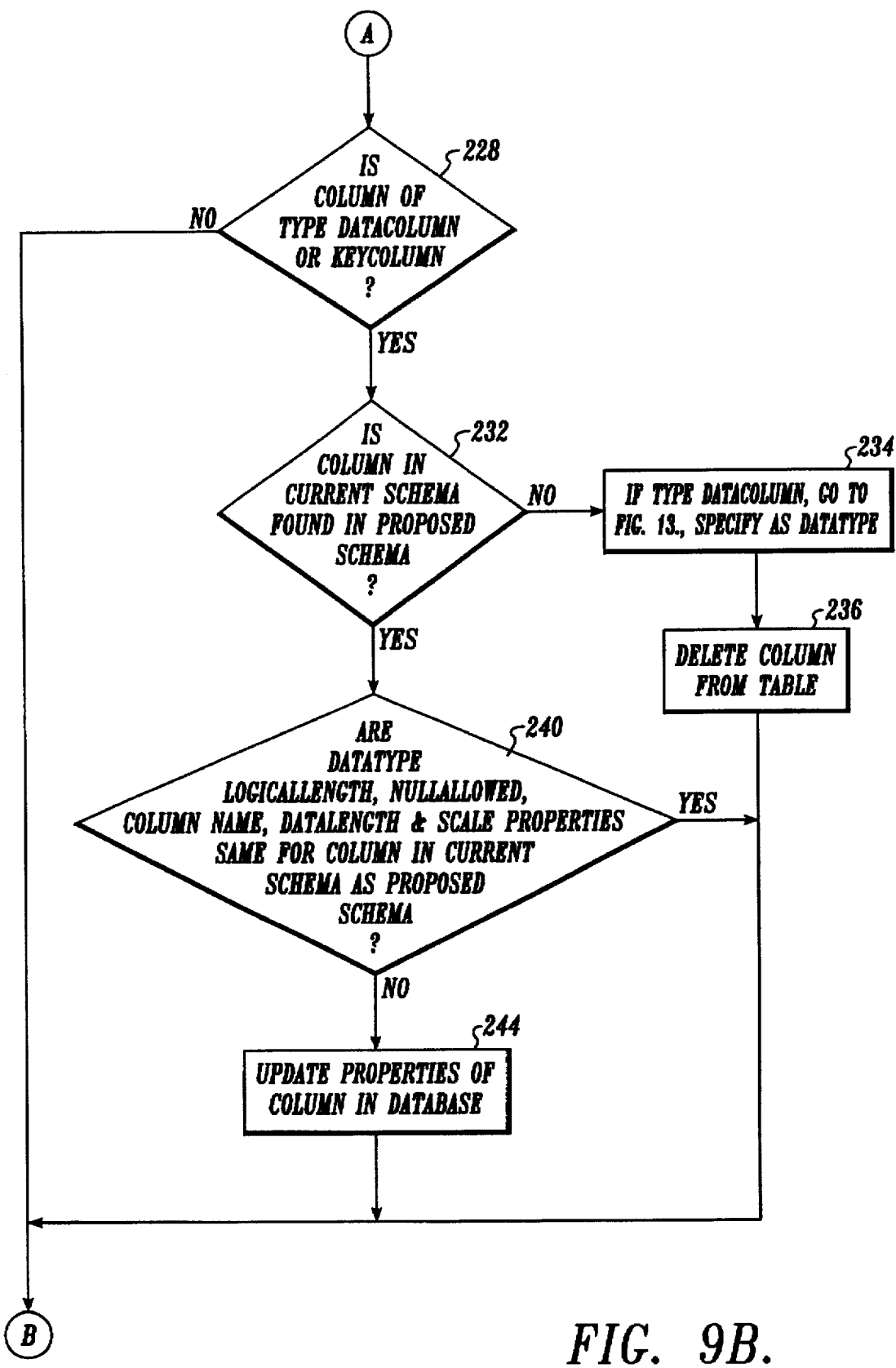
Figure 9C:
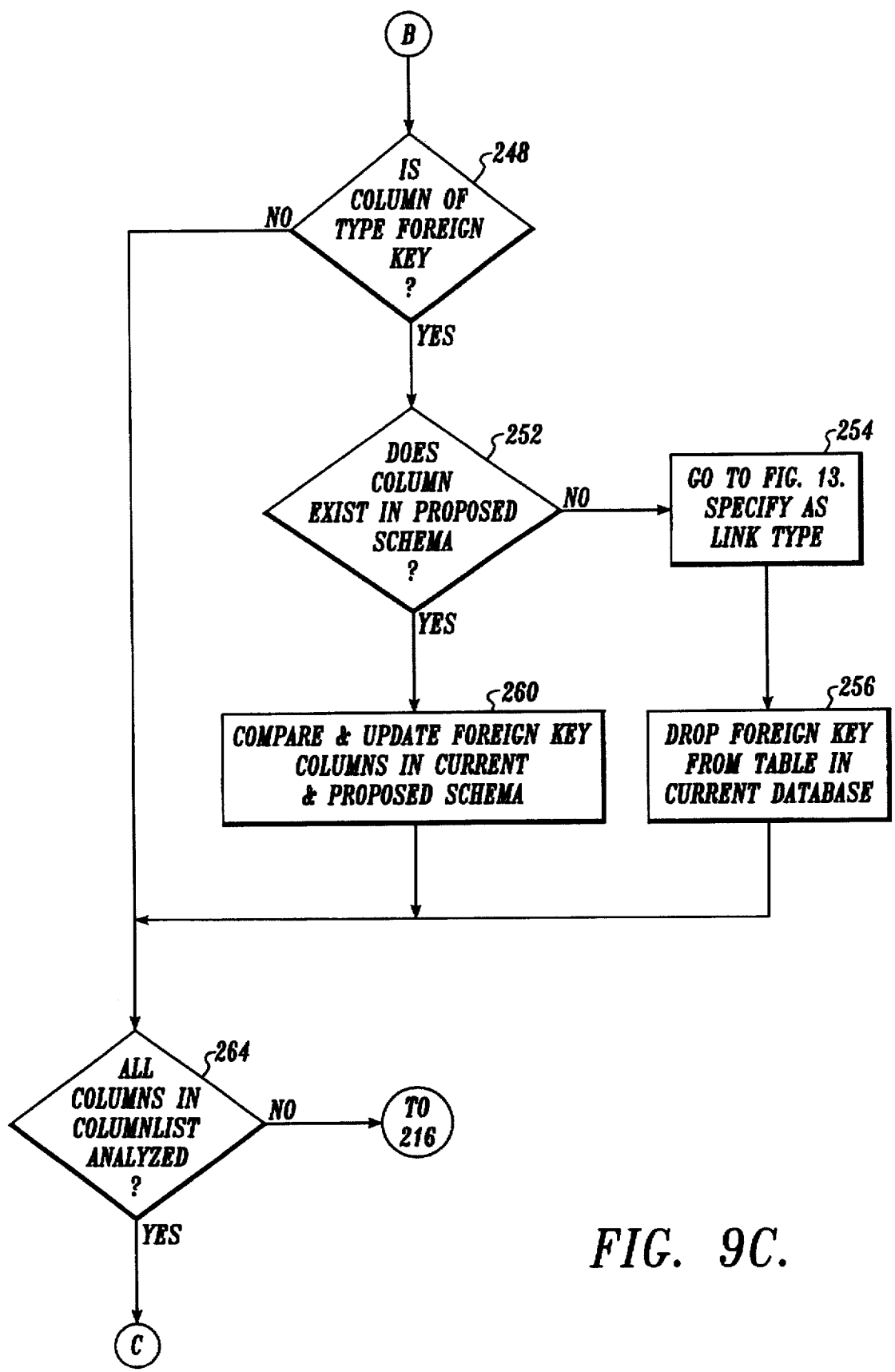
Figure 9D:
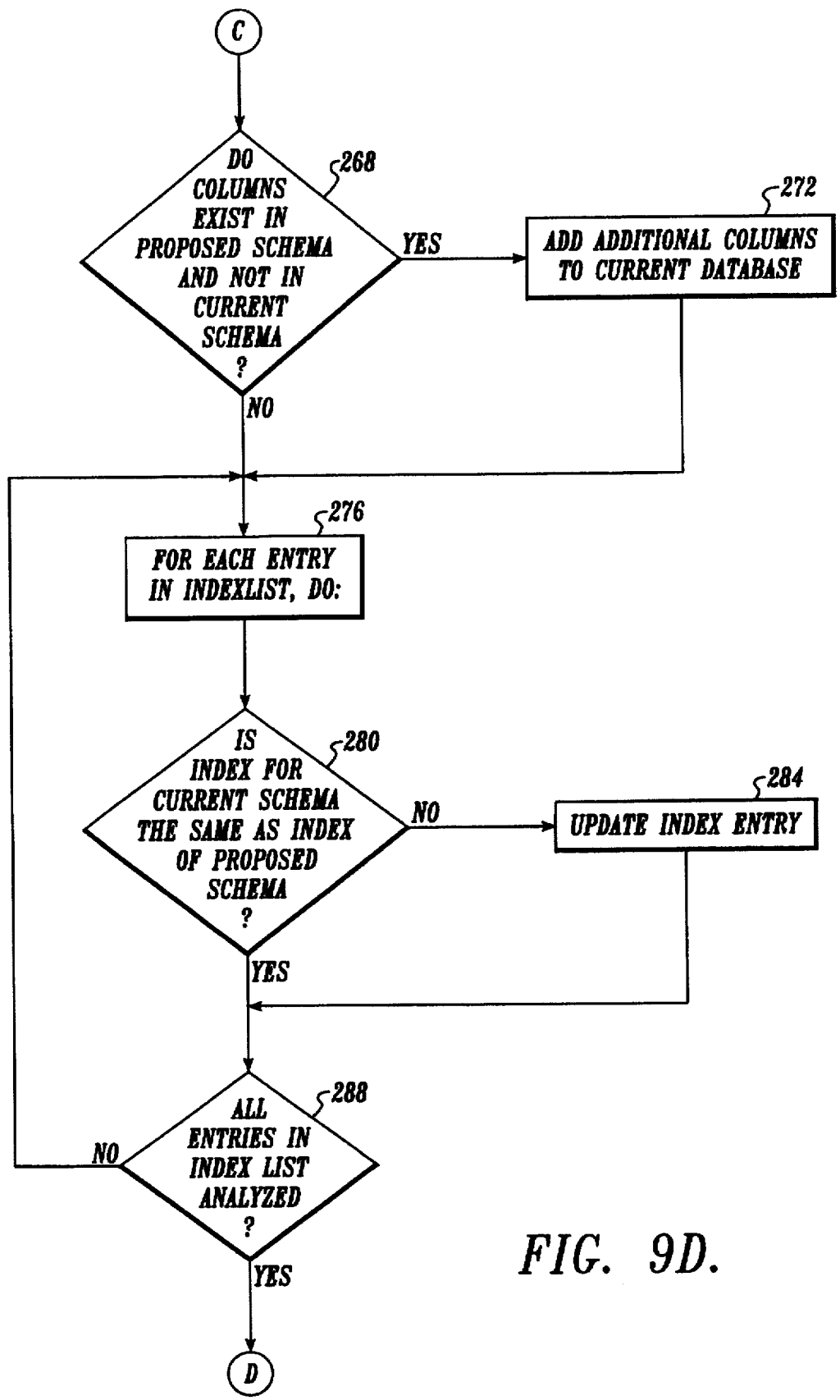
Figure 9E:
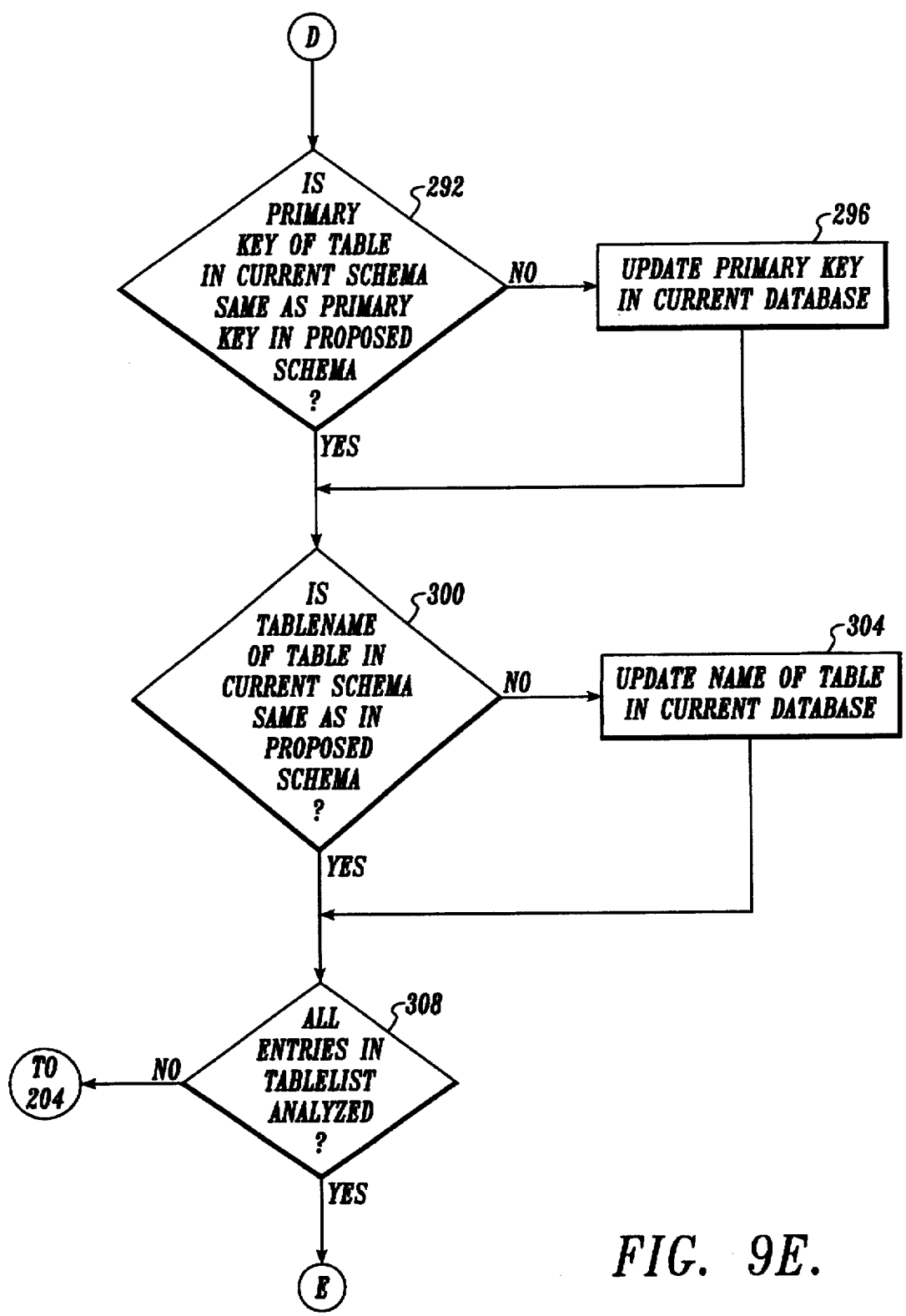
Figure 9F:
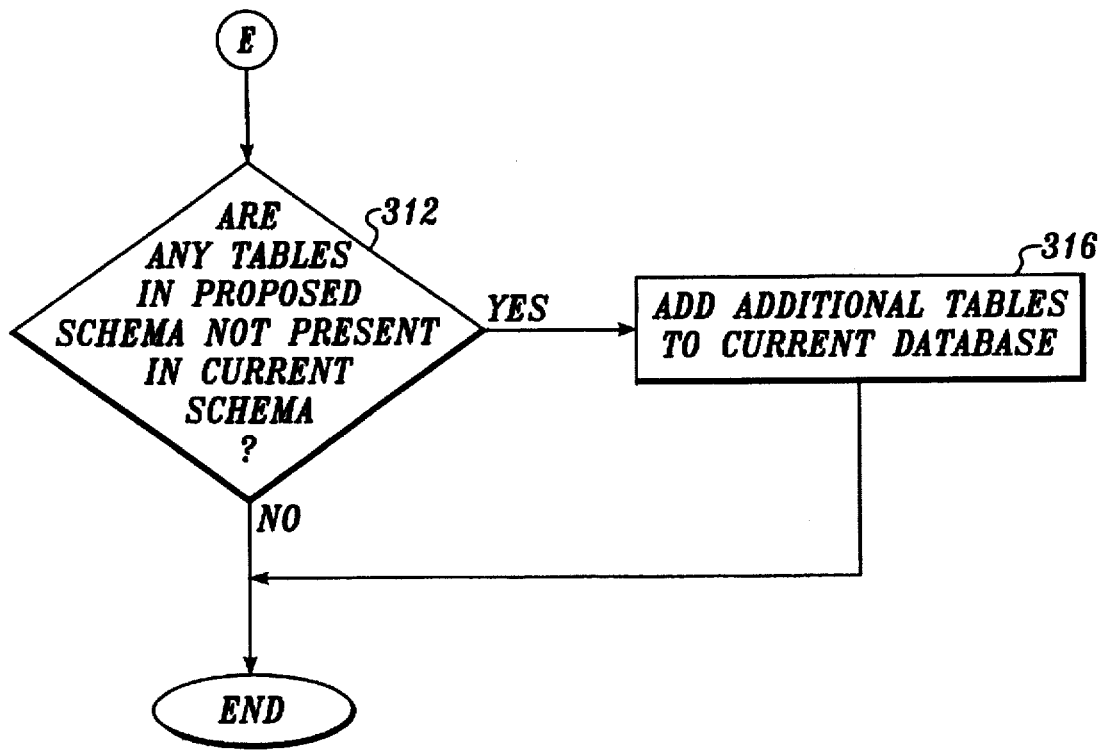
Figure 13:
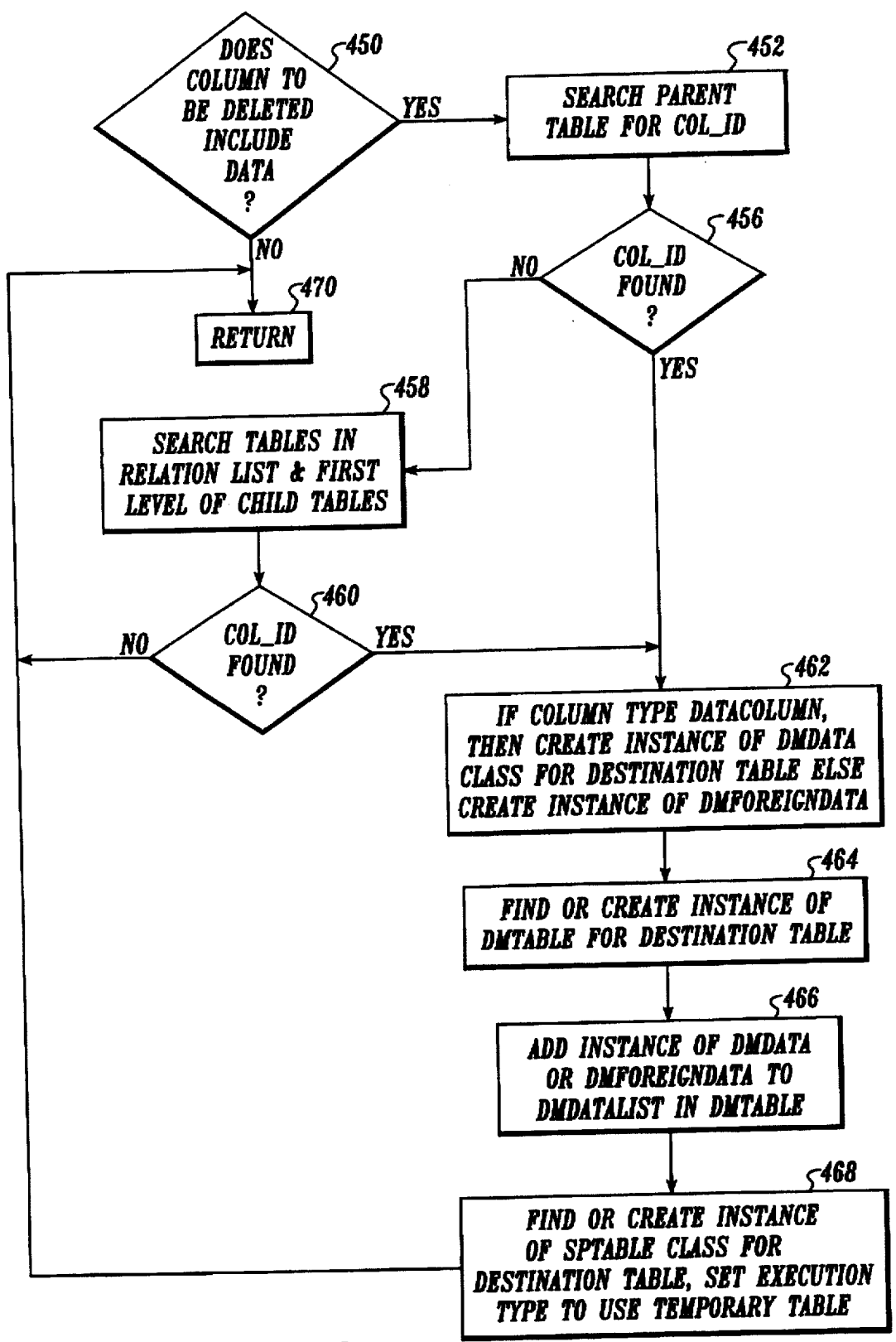
FIG. 13 is a flowchart showing the steps performed by the present invention when data within the database is moved from one table to another.

Turning now to FIG. 9B, once a column is found that is not a group, the computer system determines whether the column is of type DataColumn or type KeyColumn (step 228). If a column is defined as either of these two types, processing proceeds to a step 232 wherein it is determined if the column in the current schema is found in the proposed schema. This is performed by searching the columnList defined in the proposed table for a column having the same Col_Id number. If the column is not found in the proposed table, the user must have performed an object model change that caused the column to be deleted from the table under consideration. Before the column is deleted from a table, the computer system must determine whether the column includes data to be moved into another table. This process is shown in FIG. 13 and is described below. After performing the steps shown in FIG. 13, the column is ready to be deleted from the current table under consideration at step 236.

As will be described in further detail below, any changes to be made to the corresponding database are not made instantaneously. Rather, all the changes to be made to the database tables are stored until the current and proposed schema have been fully compared. At that time, the changes to tables in the database are made.

If a column is found in both a table in the current schema and a table in the proposed schema, the computer system determines whether the dataType, logicalLength, nullAllowed, columnName, dataLength, and scale properties are the same for the column in the current schema as in the proposed schema at step 240. If not, the properties of the column are updated at a step 244.

At a step 248 (FIG. 9C), the computer system determines whether the column being analyzed is of type ForeignKey. If so, the computer system then determines whether the key exists in the table of the proposed schema (step 252). If the key does not exist in the proposed schema, then the computer system must determine whether the column contains data that are to be moved to another table in the database using the steps shown in FIG. 13 as represented by box 254. The key is then marked to be dropped from the table in the current database at a step 256.

If the key exists in both the table of the current schema and the proposed schema, then the computer system compares and updates the member key columns that define the foreign key at a step 260 in the same manner as steps 240 and 244 described above.

At a step 264, the computer system determines whether all columns in the columnList for the table under consideration have been analyzed. If not, the computer system loops back to 216 (FIG. 9A) and the next entry in the columnList for the current table is analyzed.

Once all columns included in a table within the current schema have been analyzed, the computer system determines at step 268 (FIG. 9D) whether there are any columns that exist in the proposed table that are not found in the current table. If so, the additional columns are added to the database table under consideration at a step 272.

After all the columns in a current table have been analyzed, the computer system begins a loop at step 276 that analyzes each index within the indexList maintained for a particular table. At a step 280, it is determined whether an entry in the indexList for the current schema is found and is the same as the corresponding entry for the proposed schema. If an index in the current schema is not found in the proposed schema, it is dropped. If not the same, the entry within the indexList is updated at step 284. At a step 288, it is determined whether all entries in the indexList have been analyzed. If not, processing returns to step 276 and the next entry in the list of indices is analyzed. After step 288, any remaining indices in the proposed table not found in the current table are created.

At a step 292 (FIG. 9E), the computer system determines whether the primary key of the table in the current schema is the same as the primary key of the table defined in the proposed schema. If not, the primary key of the table in the current database is updated at a step 296. If data for the new primary key do not qualify, i.e., either not unique or contain null values, an error condition will be raised.

The computer system then determines whether the tableName property of the table in the current schema is the same as the tableName defined in the proposed schema at step 300. If not, the name of the table in the current database is updated at a step 304.

At a step 308, the computer system determines whether all entries in the tableList have been analyzed. If not, the system loops back to step 204 (FIG. 9A) and the next table is analyzed in the method described above. Once all the tables have been analyzed, the computer system determines at step 312 (FIG. 9F) whether any tables exist in the proposed schema that are not present in the current schema. If so, the additional tables are added to the current database at a step 316.

As indicated above, changes to be made to a relational table within the current database are stored in a list of actions that are to be performed. Each action to be performed as a result of changes on a component within an object in the object model is added to a list of column operations, index operations, or foreign key operations that are maintained by instances of the following class:

```
class SPTable
// Defining table operations...
    Create();
    Drop();
    ChangeName( oldName );
// Defining column operations that add entries to columnOperationList
    AddColumn( pColumn );
    DropColumn( currentColumnName );
    ChangeColumnName( pNewCol, oldColumnName );
    ChangeColumnConstraint( pColumn );
    ChangeColumnDataType( pColumn );
// Defining index operations that add entries to indexOperationList
    AddIndex( pIndex );
    DropIndex( currentIndexName );
    ChangeIndexConstraint( pIndex );
// Defining key operations that add entries to foreignkeyOperationList
```

-continued

```
    ChangePrimaryKey( );
    AddForeignKey( pForeignKey );
    DropForeignKey( currentForeignKeyName );
// Create/Alter table functions    // Execution Type
    CreateIt();                    // CREATE
    DropIt();                      // DROP
    Alter0();                      // ALTER
    Alter1();                      // REPLACE_NEWNAME
    Alter2();                      // REPLACE_SAVEDATA
    AddIndex();                    //
    DropIndex();                   //
    AddForeignKey();               //
    DropForeignKey();              //
// Base SPTable data members
    oldName;                  // Last table name defined in database
    columnOperationList;      // List of alter operation on columns
    indexOperationList;       // List of alter operation on indices
    foreignkeyOperationList;  // List of alter operation on foreign keys
    ExecutionType;            // Current mode of table altering
    operation
    *pTableDef;               // Pointer to a new table definition
                              object
    *pDMTable;                // Pointer to temp table definition
};
```

As can be seen from the class definition, the class SPTable includes a series of column, index, and key defining methods. Each method operates to add the appropriate data to the colunmOperationList, indexOperationList, and foreignkeyOperationList respectively. In addition, the class includes several create/alter table methods which allow the computer system to perform database modifications, such as create a table or drop a table, as well as to perform modifications that redefine columns within a table. The particular operations required to implement any of these methods require a series of SQL statements that may vary, depending upon the database management system that the computer system is using to operate or control the underlying relational database. For example, the computer may utilize Microsoft Access®, or Borland Paradox®, or any number of other common relational database programs to operate the relational database. In the present invention, the user is asked to identify which type of database programming is being used and the computer selects the appropriate routine(s) to perform a desired task accordingly.

Not all database systems support SQL commands that manipulate tables in the same way. For example, some database commands do not allow the name of a table to be changed once the table has been created. Therefore, the present invention must adjust the particular SQL commands selected to perform an operation based upon the capabilities of the database management system that controls the underlying relational database. The manner in which an operation must be performed for any particular database are listed in a map data structure that is loaded into memory once the computer system has been told which database a user is using. The following table is an example of a map that relates a change to be made to a relational database table with one of several methods of performing an operation.

TABLE 5

| Type of Operations | Execution Type |
|---|---|
| Create new table | CREATE |
| Drop current table | DROP |
| Change table name | REPLACE_NEWNAME |
| Add new column | ALTER |
| Add new required column | REPLACE_SAVEDATA |

TABLE 5-continued

| Type of Operations | Execution Type |
| --- | --- |
| Drop current column | ALTER |
| Change column name | ALTER |
| Change column constraint | REPLACE_SAVEDATA |
| Change data type | ALTER |
| Add new index | ALTER |
| Drop current index | ALTER |
| Change index constraint | ALTER |
| Add new foreign key | REPLACE_SAVEDATA |
| Drop current foreign key | REPLACE_SAVEDATA |
| Change index foreign key | REPLACE_SAVEDATA |
| Migrate data | REPLACE_SAVEDATA |

TABLE 5 maps a desired relational table change to one of the five different create/alter table methods defined in the SPTable class. The methods are labeled: CREATE, DROP, ALTER, REPLACE_NEWNAME, and REPLACE_SAVEDATA. Each method is defined for a particular database. For example, the REPLACE_NEWNAME routine to be used with a database created with Microsoft Access® may be defined differently than for a database created with Borland Paradox®.

To change a table within a database, the computer system selects one of the table modification methods and adds a desired operation to a list of operations to be performed for a table. For example, to add a column to an existing database table, the computer system calls the method SPTable::AddColumn (pColumn). This method adds an entry into the colunmOperationList telling the computer system to add a column referenced by the pointer argument. Additionally the method SPTable::AddColumn (pColumn) will use TABLE 5 to set the ExecutionType member variable equal to ALTER. The ExecutionType will remain ALTER until another operation updates the ExecutionType variable with another, higher ranking type. For example, the method SPTable::ChangeColumnConstraint (pColumn) sets the Execution Type to REPLACE_SAVEDATA. In the present embodiment of the invention, the highest ranking execution type is REPLACE_SAVEDATA followed by REPLACE_NEWNAME, ALTER, DROP and CREATE in that order.

The majority of commercial relational database management systems provide standardized SQL mechanisms for creating and dropping relational database tables. Therefore, the CreateIt() and DropIt() methods do not vary a great deal between different database types. However, the methods that correspond to the ALTER, REPLACE_NEWNAME and REPLACE_SAVEDATA routines will likely vary between different database management systems.

The ALTER method is employed for databases that support fairly sophisticated database changes. The database may support SQL statements to add columns to existing tables, rename columns and/or tables in the database and redefine keys (primary and foreign) of a table without having to redefine the entire table.

The REPLACE_NEWNAME method is used for database management systems that allows a table to be renamed without having to redefine the entire table.

Figure 10A:
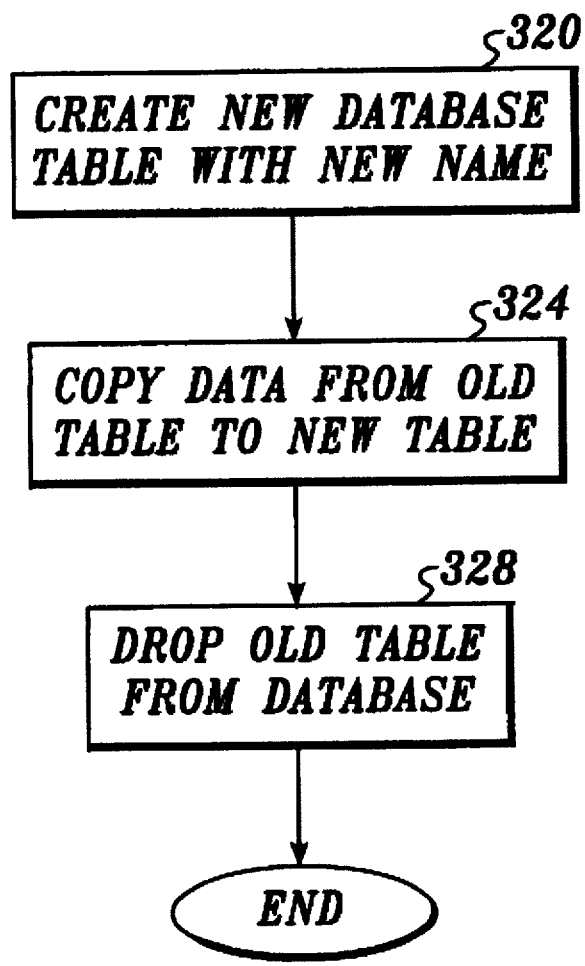
FIGS. 10A and 10B are flow charts showing the steps performed by the computer system of the present invention to modify an existing relational database.

FIG. 10A outlines the steps performed by the computer system when using the REPLACE_NEWNAME method of execution to completely redefine a table within a relational database. Beginning at a step 320, a new database table is created with a new name. At a step 324, the data from the old table are copied into the new table. At a step 328, the old table is dropped from the database.

Figure 10B:
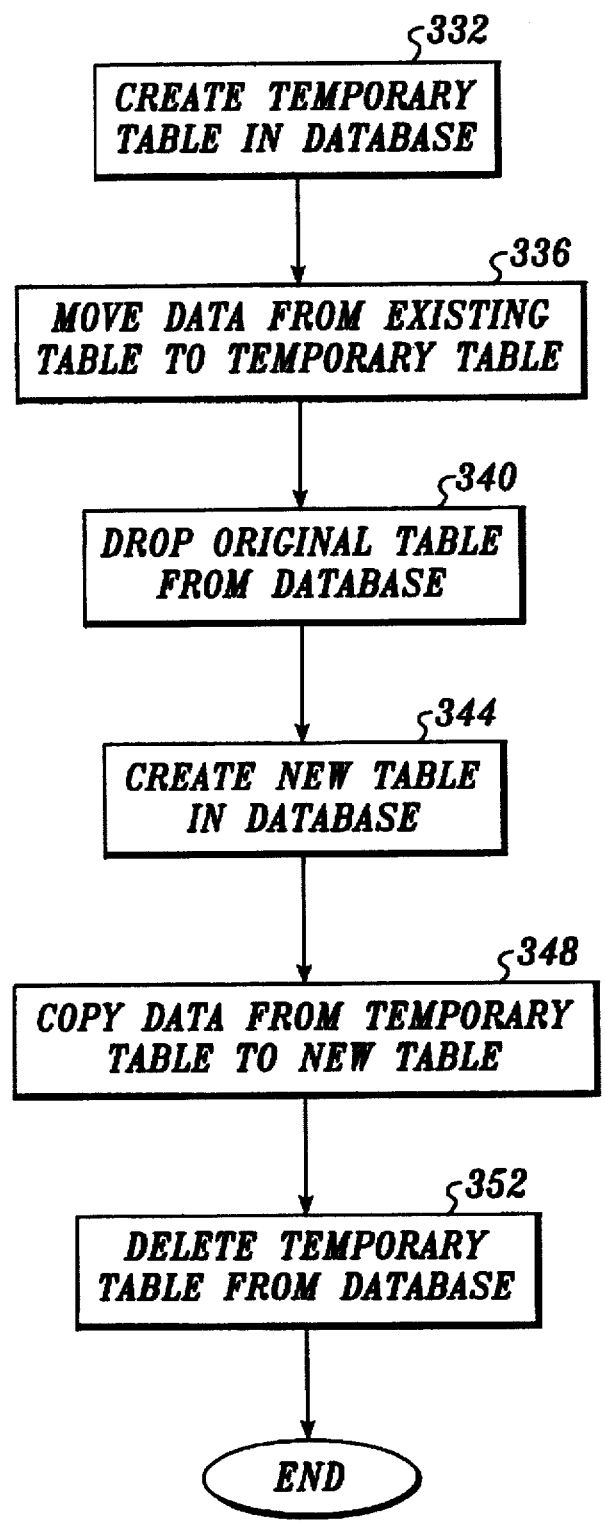

If the database management system does not support using a simple SQL statement to complete a certain operation, then a more elaborate approach must be used. FIG. 10B outlines the steps performed by the REPLACE_SAVEDATA method of execution. Beginning at a step 332, a temporary table having the same definition as the proposed table is created in the database without any key constraints. At step 336, the data are moved from the existing table to the temporary table. The original table is dropped from the database at step 340. At a step 344, a new table is created in the database and the data are then copied from the temporary table to the new table at a step 348. Finally, the temporary table is deleted from the database at step 352.

As can be seen, the map shown in TABLE 5 and described above dictates which execution routine is to be used to modify a table, depending upon the SQL features that are supported by a particular database management program that controls the underlying relational database.

In order to preserve data integrity within the database, the order in which tables are modified is important. In the presently preferred embodiment of the invention, tables having primary keys that are referenced foreign keys in other tables must be modified before the tables that contain the foreign keys. As indicated above, the operations required to modify each table in the database are stored as instances of the SPTable class. These instances are placed in a list in the correct order to preserve data integrity.

Figure 11A:
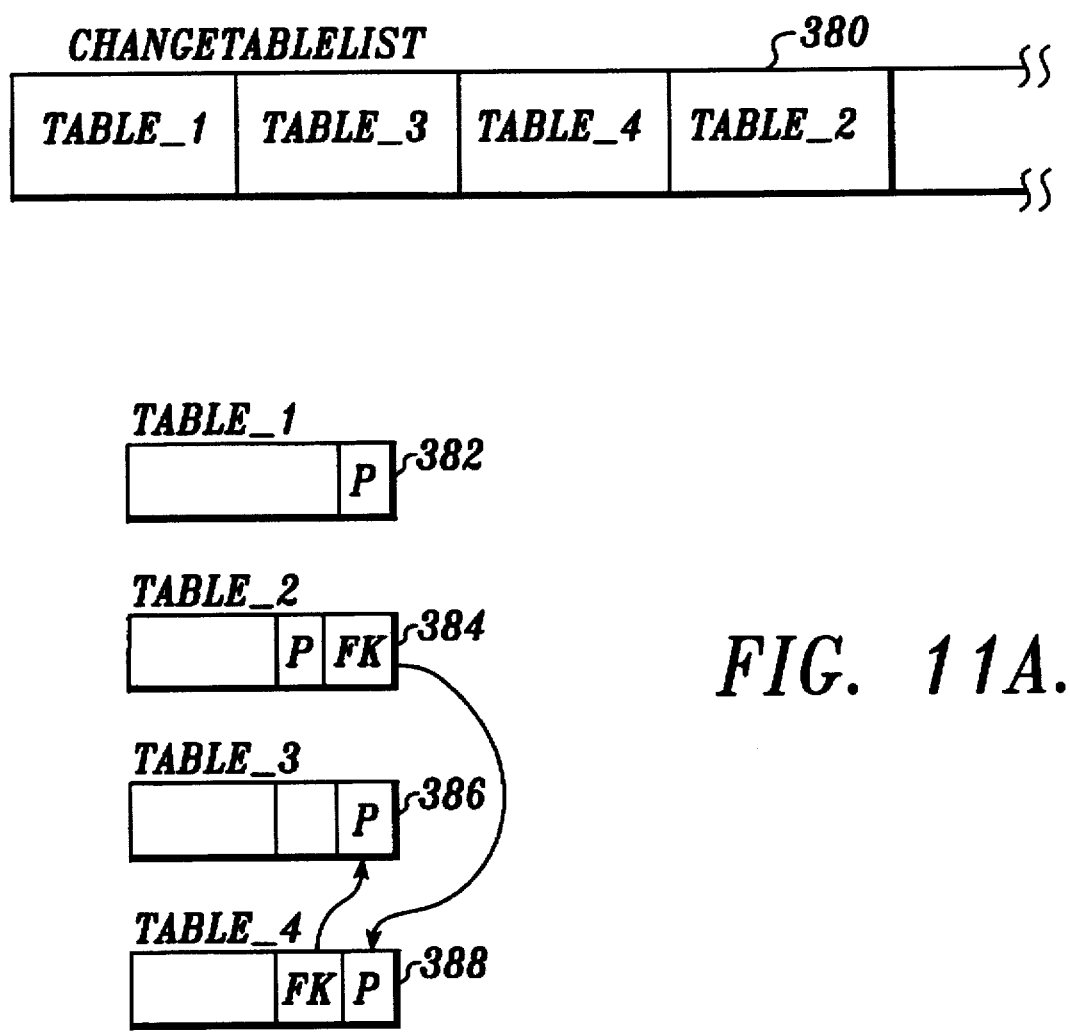
FIG. 11A is a diagram showing how changes to database tables are ordered by the present invention in a way that preserves data integrity.

FIG. 11A shows a representation of a ChangeTableList 380 that contains a number of entries corresponding to instances of the SPTable class. Each of the entries corresponds to a Table 382, 384, 386 and 388. The Table 382 contains a primary key but does not reference any other tables. Table 384 includes a foreign key to table 388, and table 388 contains a foreign key to table 386. In order not to violate data integrity constraints, a table having a primary key referenced by a foreign key in another table must be modified before the table that contains the foreign key. This ordering scheme is referred to as least dependent order.

In the present invention, the instances of the SPTable class are inserted into a list in a least dependent order. Tables not having relations to any other table can be inserted anywhere in the list, while tables containing foreign keys must be modified after the tables that they reference. For the example shown in FIG. 11A, table 386 must be modified before table 388, and table 388 must be modified before table 384. Table 382 can be modified at any time.

Figure 11B:
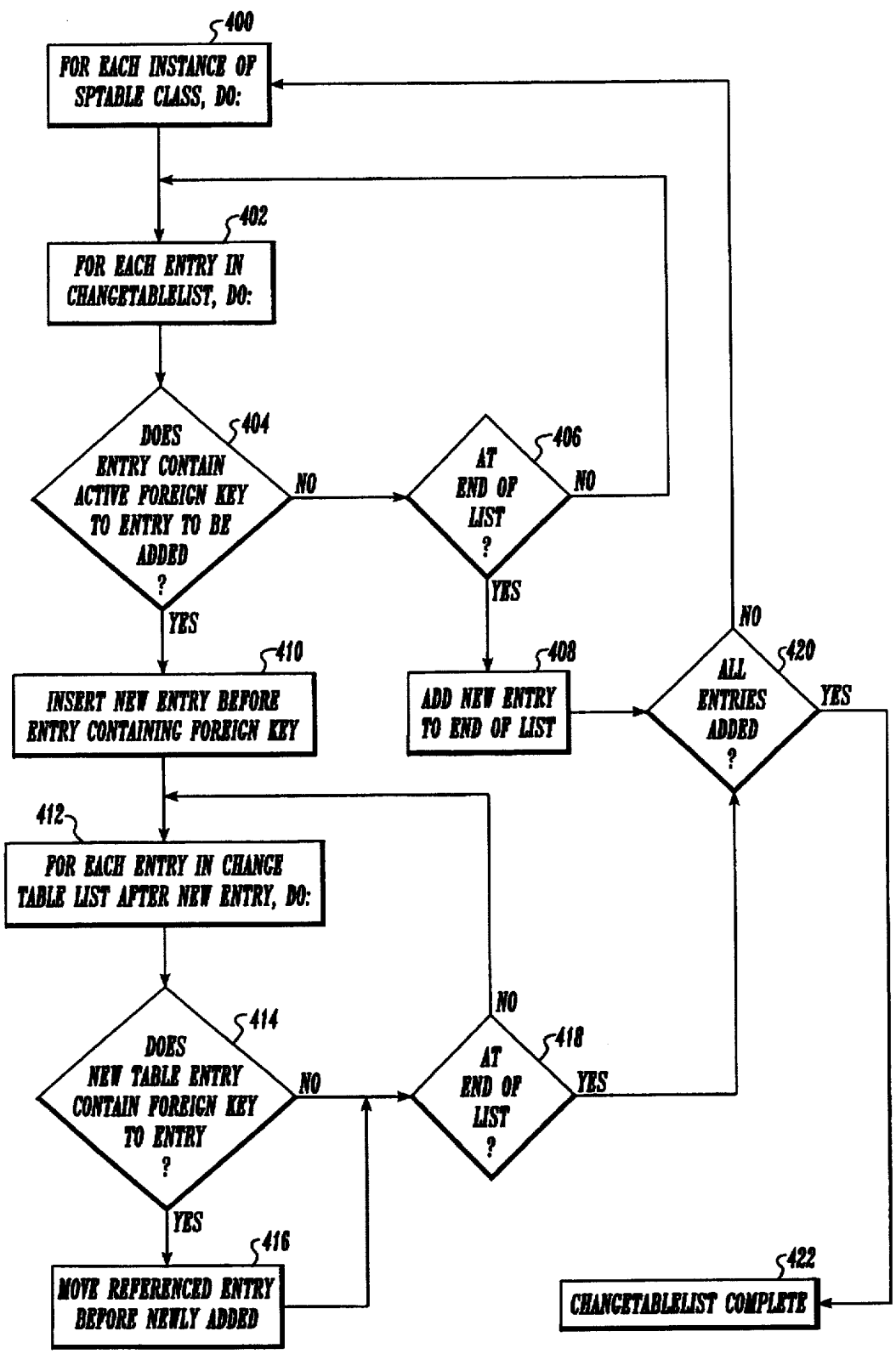
FIG. 11B is a flow chart showing the steps performed by the computer system of the present invention to modify database tables in an order of least dependency.

FIG. 11B shows the steps taken by the present invention to insert the instances of the SPTable class into a list called ChangeTableList in the least dependent order. The computer begins at a step 400 that analyzes each instance of the SPTable class to be inserted into the ChangeTableList. At a step 402, the computer system begins a loop that analyzes each entry already in the ChangeTableList. At a step 404, the computer system determines whether the entry already in the list contains an active foreign key to the entry to be added. If not, the computer system determines whether all entries already in the list have been analyzed at step 406. If the answer to step 406 is no, the computer system loops back to step 402 and the next entry in the ChangeTableList is analyzed. If the answer to step 406 is yes, then the new entry is added to the end of the list at step 408.

If the answer to step 404 is yes, meaning that an entry already in the list contains an active foreign key to the entry to be added, then the new entry is placed before the entry containing the foreign key at a step 410.

At a step 412, the computer then begins a loop that analyzes each entry that exists after the newly-added entry. At a step 414, the computer system determines whether the newly-added entry contains a foreign key to an entry that is positioned after the newly added entry in the list. If so, the computer system then moves the entry referenced by the new entry to a position before the new entry containing the foreign key at a step 416. If the answer to step 414 is no, the computer system determines whether all remaining entries in the ChangeTableList have been analyzed at a step 418. If the answer is no, the computer system loops back to step 412. If the end of the list has been reached, the computer system then determines whether all instances of the SPTable class have been added to the list at a step 420. If not, the computer system loops back to step 400 and adds the next new entry to the list.

Once all instances of the SPTable class have been added to the ChangeTableList, the ChangeTableList is indicated as being complete at step 422. After performing the steps shown in FIG. 11B, the tables of the database are set to be modified in an order that will preserve data integrity.

Figure 11C:
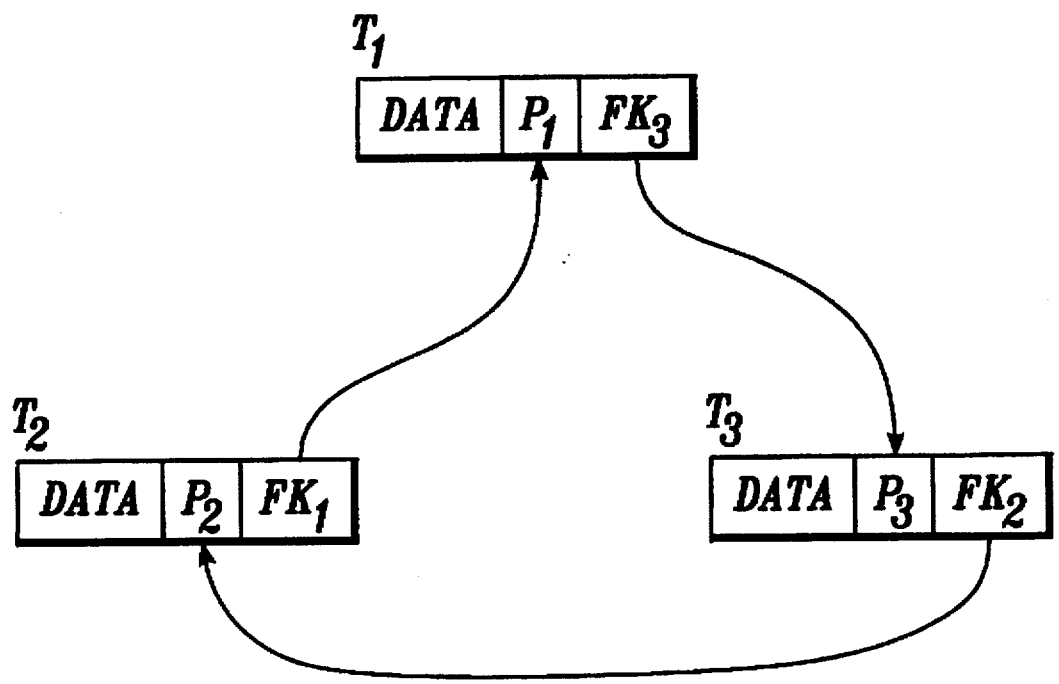
FIG. 11C is a diagram showing relational database tables defined in a circular relationship.

The only exception to the ordering scheme described above is when a set of tables have a circular dependency on each other. FIG. 11C illustrates this type of relation among three tables, $T_1$, $T_2$ and $T_3$. When a particular database system supports adding and dropping foreign key definitions of a relational table through simple SQL syntax to drop or add a foreign key without redefining the table, any circular relationships can be handled by first dropping affected foreign key definitions before modifying other table definitions and then restoring all needed relations. After dropping the foreign key relations, the instances of SPTable class representing the operations to be performed on a table can be inserted in the ChangeTableList at any point. When this option is not available the tables may be modified in any order and any relations that define a circular relationship are not declared. Affected tables are defined to have corresponding key columns for storing data to be entered, but those columns are not declared as foreign keys.

Many of the tables being modified in the database will contain previously stored data. Therefore, there are schema modifications in which data must be moved from one table to another in order to accurately reflect a change that a user has made to the corresponding object model. This is referred to as data migration.

Typically, instances of data migration are indicated when a data column is to be dropped from a table. Therefore, before step 236 shown in FIG. 9B, the computer system determines whether a column to be deleted from a table contains data. When a ForeignKey column is to be dropped from the database, the computer determines whether the column contains data before the column is dropped at step 256.

Figure 12:
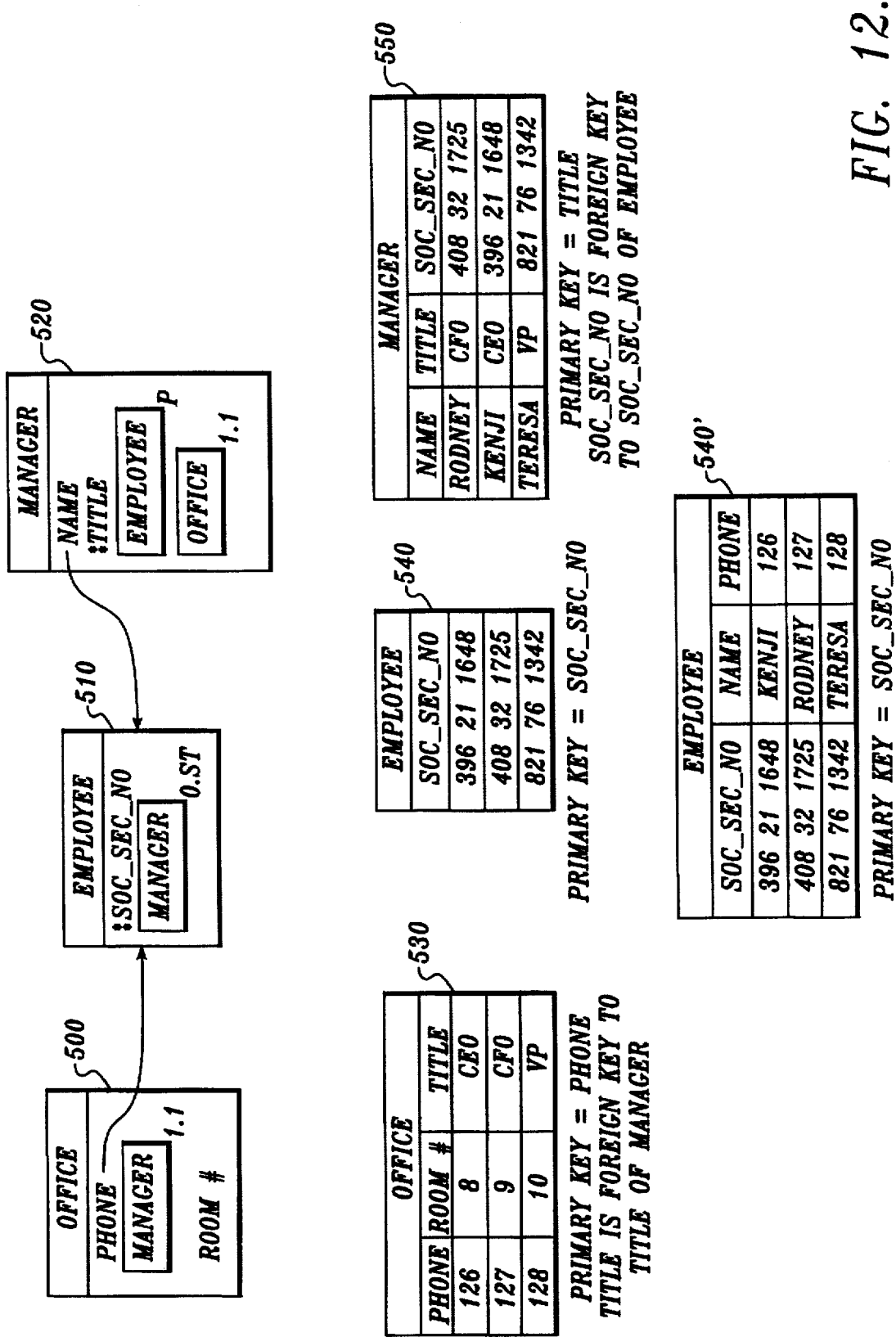
FIG. 12 is a representation of how data is moved from one diagrammatic table to another to represent a change made to a corresponding object model.

In order to better understand the way in which the computer system moves data from one relational table to another, FIG. 12 shows a representation of an object model and the corresponding relational tables that require data migration. The object model includes three objects 500, 510 and 520 that represent an office, an employee and a manager respectively. The object 500 is associated with a relational table 530. The object 510 is associated with a relational table 540 and the object 520 is associated with a relational table 550.

In the example shown, a user has moved a simple value component labeled "Phone" from the object 500 and placed it in the object 510. Similarly, the simple value object labeled "Name" has been moved from the object 520 into the object 510. Each of the components is associated with data stored in the corresponding tables 530 and 550.

To represent the object model change, the data must be moved from the two source tables 530 and 550 into the destination table 540. This is accomplished by creating a temporary table (not shown) that receives any existing data that may be stored in the destination table (i.e., the data stored in the column labeled "Soc_Sec_No" from the table 540), as well as the data stored in the columns labeled "Phone" and "Name" from the source tables 530 and 550, respectively. After the data has been moved to the temporary table, the columns labeled "Phone" and "Name" of the tables 530 and 550 can be deleted from the database. The original table 540 is dropped, a new table 540' is created and the data from the temporary table are copied into the new table 540'. Finally, the temporary table is deleted.

FIG. 13 shows some of the steps performed by the computer system of the present invention to move data from one table to another in an existing database. Beginning at a step 450, the computer system determines whether the column to be deleted from a table includes data. As will be appreciated by those skilled in the art, this is performed using an SQL statement that returns the number of rows in a column. If the column contains data, the computer system then searches any parent table of the table containing the column to be deleted for a column having the same Col_Id number at step 452.

At a step 456, the computer system determines whether a column having the same Col_Id number as the column to be deleted was found. If the answer to step 456 is no and the Col_Id was not found, then the computer system begins a search of object tables that are related by a foreign key to the table in which the column is to be dropped (step 458). At a step 460, it is determined whether a column having the same Col_Id as the column to be deleted was found in the related tables.

Once a column to be deleted is located in another table in the database, the computer system generates an instance of one of the following classes DMData or DMForeignData at step 462.

```
class DMData
{
SourceTable;        // Where data is coming from
DestTable;          // Table to receive data
SourceCol;          // Column to provide the data
DestCol;            // Column to receive the data
MigrationType;      // One-to-One, One-to-Many, etc.
DataType;           // Value or Link
Migrationpath;      // List of Foreign key relations between source and
                    // destination tables
};
```

The DMData class is used to store information about a column containing data that is to be moved from one table to another. The migration path specifies a series of tables relating a destination table and a source table. The migration path is a list of data structures for each table and a foreign key relation to a next table in the list. The steps performed by the computer system to compute the migration path are set forth in greater detail below.

When the column to be moved is of type ForeignKey, an instance of the DMForeignData class is created.

```
class DMForeignData: public DMData.
{
*pDestForeignKey,     //pointer to foreign key in proposed table
```

-continued

```
    *pSourceForeignKey;    //pointer to foreign key in current table
};
```

As shown in FIG. 12 a table may receive data from multiple source tables. Therefore, the following class stores the instances of DMData and DMForeignKeyData that describe each source table that will provide the data to be migrated into a destination table.

```
Class DMTable
{
DMDataList;        // List of all instances of DMData or
                   // DMForeignData
*TableDef;         // Pointer to definition of destination table to receive
                   // data
TempTableName;     // Temporary table to hold data during transfer
};
```

Only one instance of DMTable is created for any destination table. Therefore at step 464 (FIG. 13), the computer system determines if an instance of this class has been created for the destination table and, if not, creates an instance for the table.

At a step 466, the computer adds the instance of DMData or DMForeignData to the DMDataList for each column of data that is to be moved into the destination table. If the destination table is to include data that is found in the original table, then an instance of DMData is created for each original column of data that will be copied into the new table.

At a step 468, the computer finds or creates an instance of the SPTable class defined above for the destination table. As previously indicated, the SPTable class defines what operations are to be performed on a table. The instance of the SPTable class includes a pointer to the instance of DMTable class created for the destination table. The execution type for any table receiving data is always set to REPLACE_SAVEDATA in order to use the table modification steps outlined in FIG. 10B and described above.

The following illustrates the basic format of an SQL statement that creates a temporary table and inserts with the data from three different tables for the example shown in FIG. 12.

```
CREATE      TempTbl (Soc_Sec_No, Int, Name Text(50),
TABLE       Phone Text(25));
INSERT INTO TempTbl (Soc_Sec_No, Name, Phone)
SELECT      Employee.Soc_Sec_No, Manager.Name, Office.Phone
FROM        Employee, Manager, Office
WHERE       Manager.Soc_Sec_No is foreign key to
            Employee.Soc_Sec_No
AND         Office.Title is foreign Key to Manager.Title
```

With the present standard SQL, it is not possible to insert multiple sets of data from different tables sequentially. As the above statement illustrates, all three source colas and their corresponding tables have to be specified at the same time. The WHERE clause specifies how data rows from different tables are related according to specific migration path of each data set.

TABLE 6 shown below classifies different types of migration paths for properly defining table relations for data insertion. This table is for migrating data as values (i.e., not as foreign keys). There are five different migration path types of value type data migrations.

TABLE 6

Value Type Data Migrations

| | |
|---|---|
| One_To_One | Data moved without a cardinality change as a result of: moving a component into an object related through a single one-to-one object link relationship |
| One_To_Many | Data moved with cardinality increase as a result of: component cardinality changed from one to N moving a single-valued component into a multi-valued group component |
| Many_To_One | Data moved with cardinality reduction as results of: component cardinality changed from N to one moving a component out of a multi-valued group to a containing group or object |
| Many_To_Many | Data merged with another set of data as results of: changing multi-valued component to single-valued and moving into a multi-valued group |
| Copy | Simple data copy from an original to a temp/new table |

An example of a one-to-one value type data migration is shown in FIG. 12, where the Name component is moved from the Manager object 520 to the Employee object 510. These two objects are related by a single-valued object link component.

An example of a one-to-many value type data migration is shown in FIG. 7 where the cardinality of the Major component is changed from one to N. An example of a many-to-one value type data migration would be the inverse of the cardinality change shown in FIG. 7.

Figure 12A:
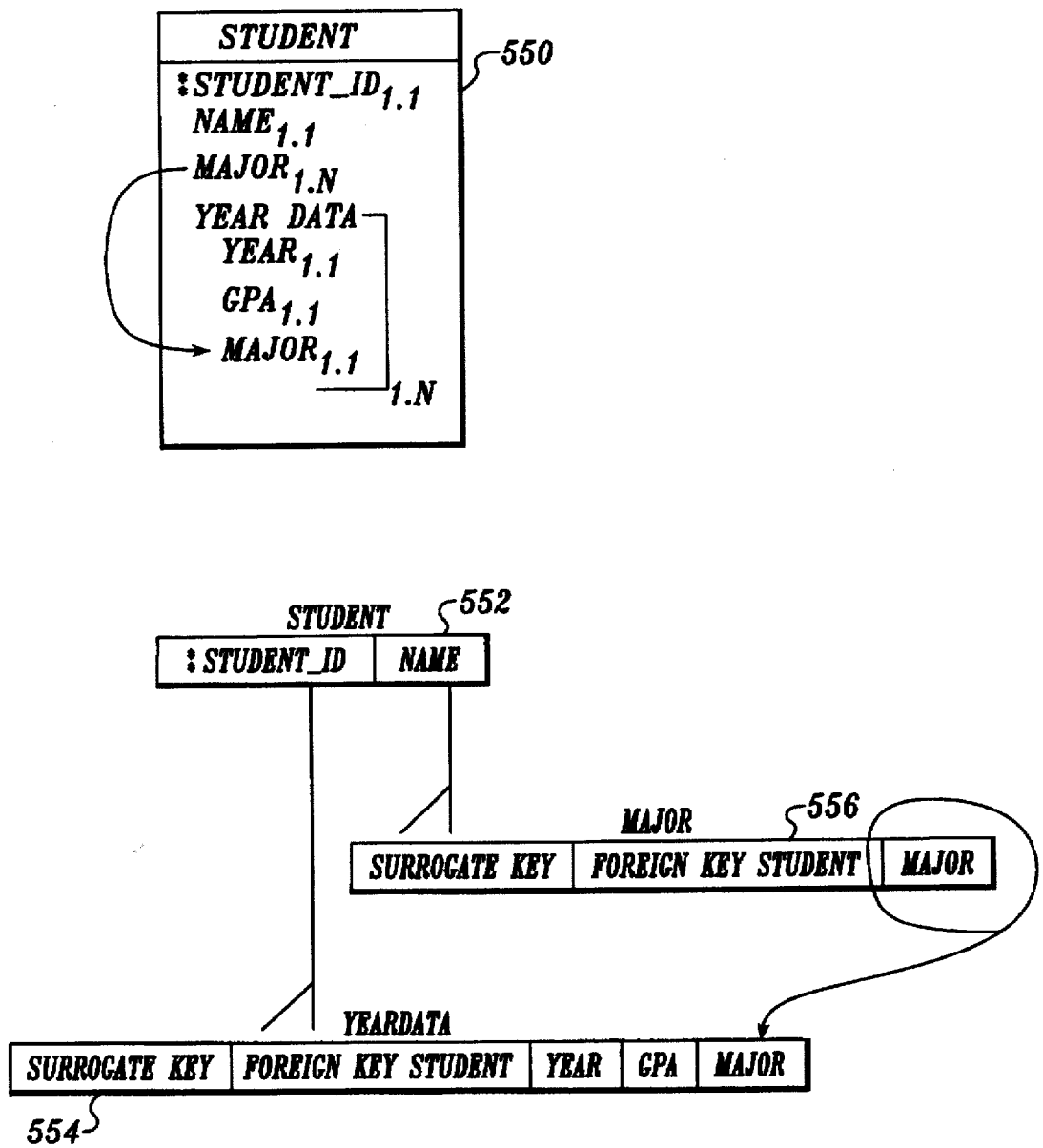
FIG. 12A illustrates a many-to-many value type data migration.

An example of a many-to-many value type data migration is shown in FIG. 12A. Here an object 550 represents a student. The object contains two single-valued, simple value components labeled "Student_ID" and "Name". In addition the object 550 includes a multi-valued, simple value component labeled "Major" and a multi-valued group component labeled "YearData."

A table 552 represents the object 550 in the database. This table has two child tables 554 and 556. The table 554 contains columns that hold a surrogate key, a foreign key to the parent table 552, and columns that store data for a year and a gpa. The table 556 has columns that hold a surrogate key, a foreign key to the parent table 552 and a column to store the student's major.

A many-to-many value type data migration occurs if a user changes the cardinality of the component labeled "Major" from N to one, and moves it in the multi-valued group YearData. To represent this change in the database, the column that stores the student's major is moved from the table 556 into its sibling table 554.

A copy type data migration occurs when data is moved from an original version of a destination table to a modified version of the destination table. For example, moving data in the Soc_Sec_No column in the table 540 to the table 540' shown in FIG. 12 is an example of a copy type data migration.

Another set of migration types are used to classify moving data that represent a foreign key from one table to another. When a relationship between two objects is changed, some changes may need to be made for the corresponding foreign keys. Table 7 classifies various types of link type data migrations.

TABLE 7

Link Type Data Migrations

| | |
|---|---|
| One_To_One | Foreign key moved to referenced object table |
| Many_To_One | Foreign key moved from a component table (i.e. link in a multi-valued group) to the referenced object table |
| UPDATE | Foreign key column(s) definition changed due to changes in the corresponding primary key column(s), i.e., no changes in the relation data |
| REPLACE | New foreign key defined due to change of a parent table |

An example of the one-to-one link type data migration is shown in FIG. 8 where the foreign key column is moved from the Professor table 182 to the Student table 186.

Figure 12B:
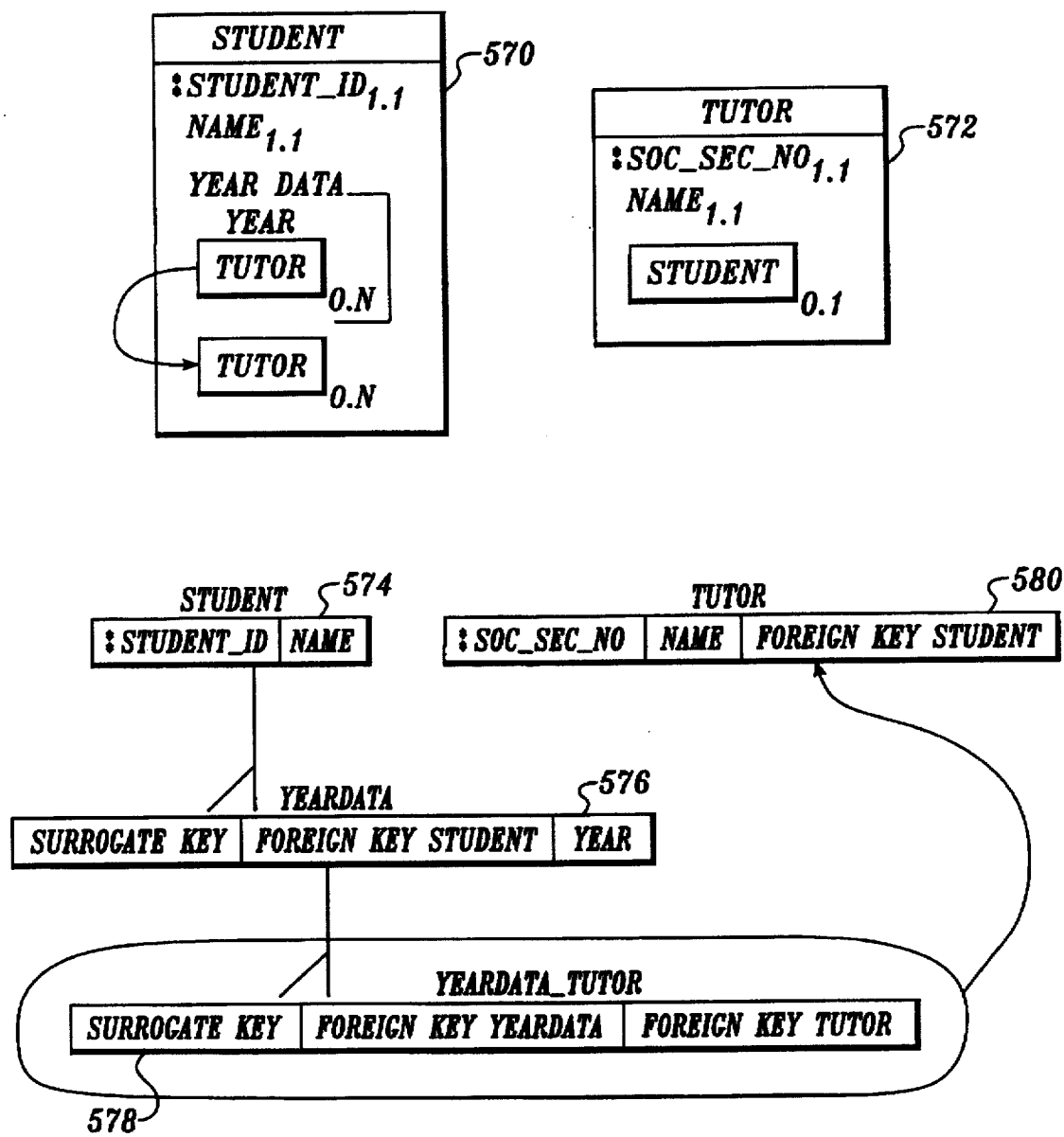
FIG. 12B illustrates a many-to-one link type data migration.

An example of a many-to-one link type data migration is shown in FIG. 12B. Here an object 570 represents a student. The object includes three components, namely, two simple-valued components labeled "Student_ID" and "Name" as well as a group component labeled "YearData." The group component includes a simple value component labeled "Year" and an object link component labeled "Tutor." The object link component links the Student object 550 to an object 552 that represents a tutor of the student. A many-to-one link type data migration occurs when a user moves the Tutor object link component out of the multi-valued group YearData.

Before the modification, the object model shown in FIG. 12B can be represented in the database by four tables. A table 574 has two columns that hold a student's identification number and the student's name. A table 576 is a child table of the table 574. The table 576 has three columns that hold a surrogate key, a foreign key to the table 574 and a year. A table 578 is a child table of the table 576. The table 578 has three columns that hold a surrogate key, a foreign key to the table 576 and a foreign key to a table 580 that holds data that describes a tutor. By moving the Tutor object link component out of the multi-valued group Year Data, the computer system deletes the table 578 and adds a column to the table 580 that will hold a foreign key to link the table 580 with the table 574.

Update and replace link type data migrations occur when a change to a table's primary key causes corresponding changes in those tables that use the primary key values as foreign keys.

When a column to be dropped from a table is found in another table in the proposed schema, a migration data type (value or link) is identified. Based on this information, the migration path required to compose the SQL statement that will move the data is computed for each DMData and DMForeignData class instance in the DMTable class instance created for the destination table.

Figure 14A:
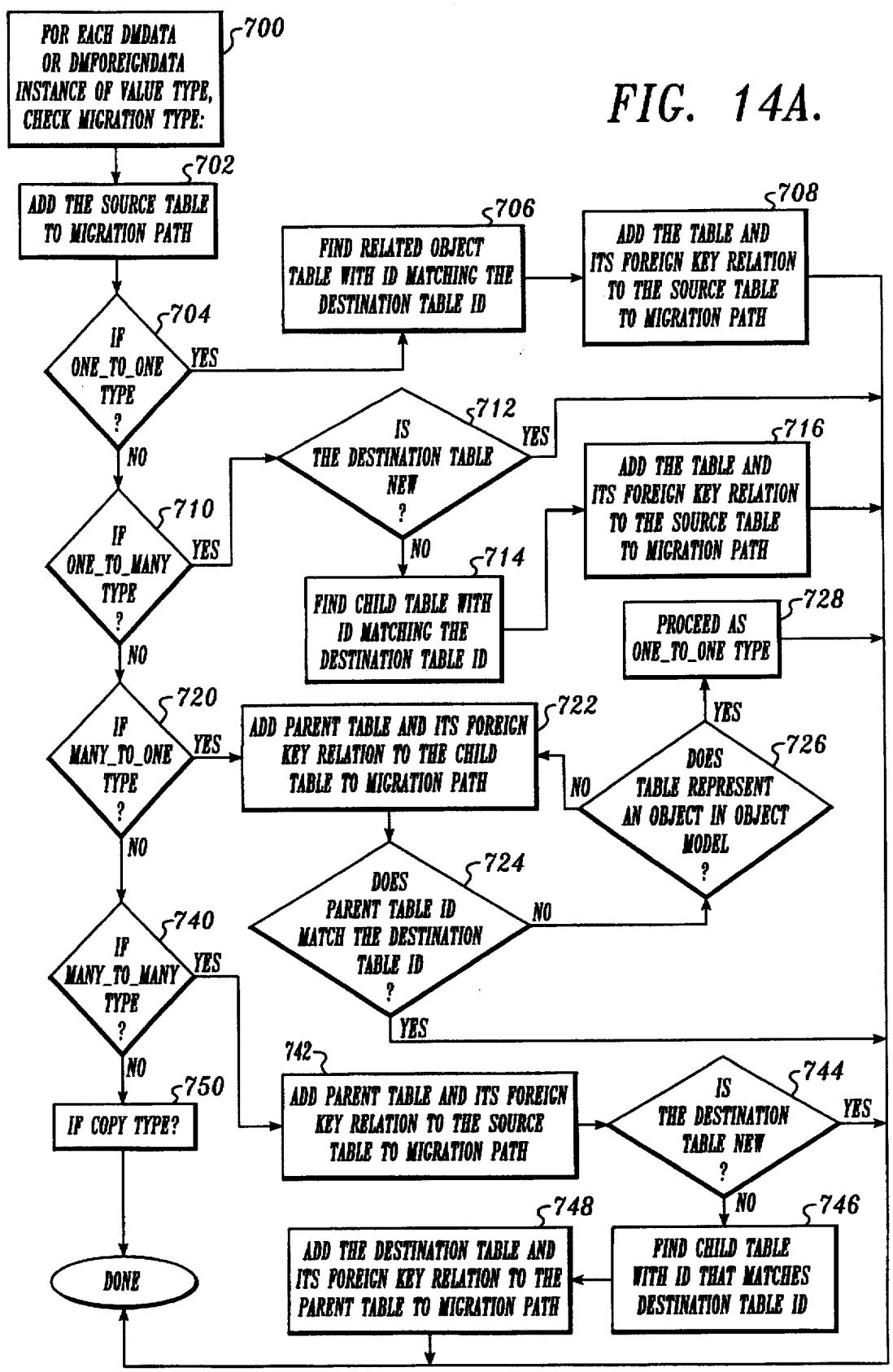
FIGS. 14A–14C are flow charts showing the steps performed by the present invention to compute a migration path.
Figure 14B:
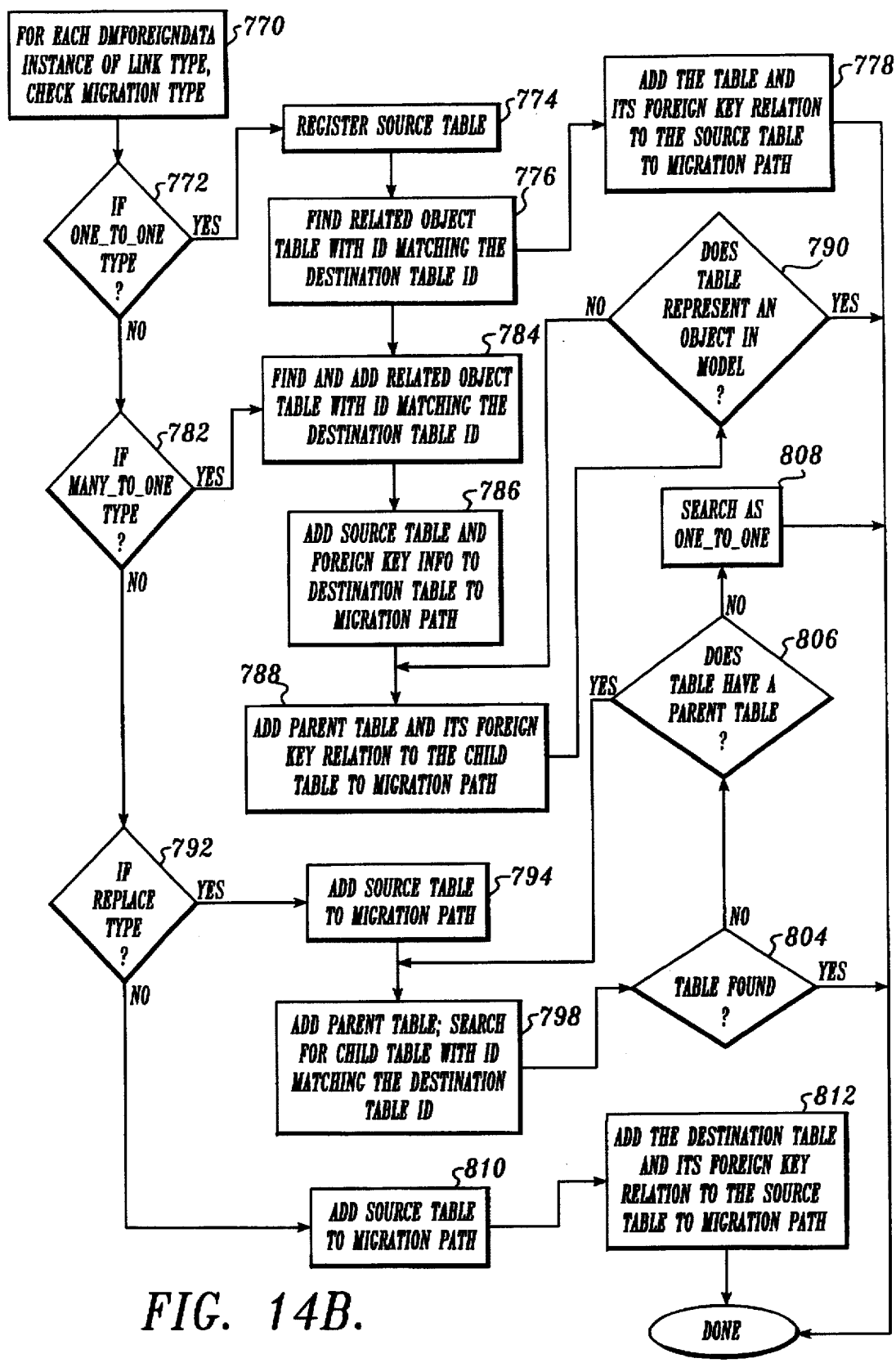

FIGS. 14A and 14B show the steps performed by the computer system to compute the migration paths for value type data migrations and link type data migrations. Referring to FIG. 14A, the computer begins a loop at step 700 that analyzes each instance of the DMData or DMForeignData having a DataType equal to "value" by first checking the migration path type (i.e. one-to-one, one-to-many, many-to-one, many-to-many or copy). The source table is then added as the first entry into the migration path being computed at step 702.

At a step 704, the computer determines if the migration type is one-to-one. If so, the computer then finds the related object table in the current schema having a table_Id that matches the table_Id of the destination table in the proposed schema at step 706. For the one-to-one example shown in FIG. 12, the computer locates the Employee table 540. Next, the computer system registers the table located in step 706 and its foreign key relation to the source table (step 708). In the example shown in FIG. 12, the computer will register the Soc_Sec_No column in the Manager table 550 as a foreign key to the Employee table 540 to complete the migration path.

If the answer to step 704 was no, the computer system determines at step 710 whether the migration type is one-to-many. If so, the computer determines at step 712 if the destination table is new (i.e. not found in the current schema). If so, there is no further migration path to be defined. If the destination table is not new, the computer system searches the current schema for a child table having a table_Id that matches the table_Id of the destination table at step 714. The computer then adds the child table and its foreign key relationship to the source table at step 716 to the migration path. In the one-to-many example shown in FIG. 7, the migration path lists the Student table 172 as the source, the Major table 176 as the destination and the fact that the Student_Id column of the Major table is a foreign key to the Student table 172.

If the migration type was not one-to-one or one-to-many, the computer determines whether the type is many-to-one at step 720. If so, the parent table to the source table is added to the migration path as well as the foreign key relation between the source table and the parent table at step 722. Next, the computer determines whether the table_Id of the parent table matches the table_Id of the destination table (step 724). If so the migration path is compete. If not, the computer determines if the patent table represents an object in the object model at step 726. If not, the computer return to step 722 and adds the parent table of the parent table to the migration path as well as the foreign key information. As will be appreciated by those skilled in the art, step 722 adds each table between the source table and the table representing the object in the object model to the migration path. If the answer to step 726 is yes, the computer proceeds as in the one-to-one migration type described above at steps 706 and 708 (as represented by box 728).

If the answer to step 720 was no, the computer determines if the migration type is many-to-many. If so, the computer adds the parent table of the source table and the foreign key relation to the migration path at step 742. At step 744, the computer determines whether the destination table is new (i.e. not defined in the current schema). If so, the migration path is complete. If the destination table is not new, the computer searches the current schema for a child table having a table_Id that matches the destination table_Id at step 746. Finally, the computer adds the destination table and its foreign key relation to the parent table at step 748.

If the answer to step 740 was no, the computer knows the migration is a copy type, and there is no migration path to be completed.

der to allow the user to make changes in the existing object relationships at the same time. An example can be seen in FIG. 12 by deleting the Office object 500 and the Manager object 520 after moving the components labeled "phone" and "name". Because all the information necessary to migrate the data is still available in the current schema, the user could make all these changes at once.

Figure 14C:
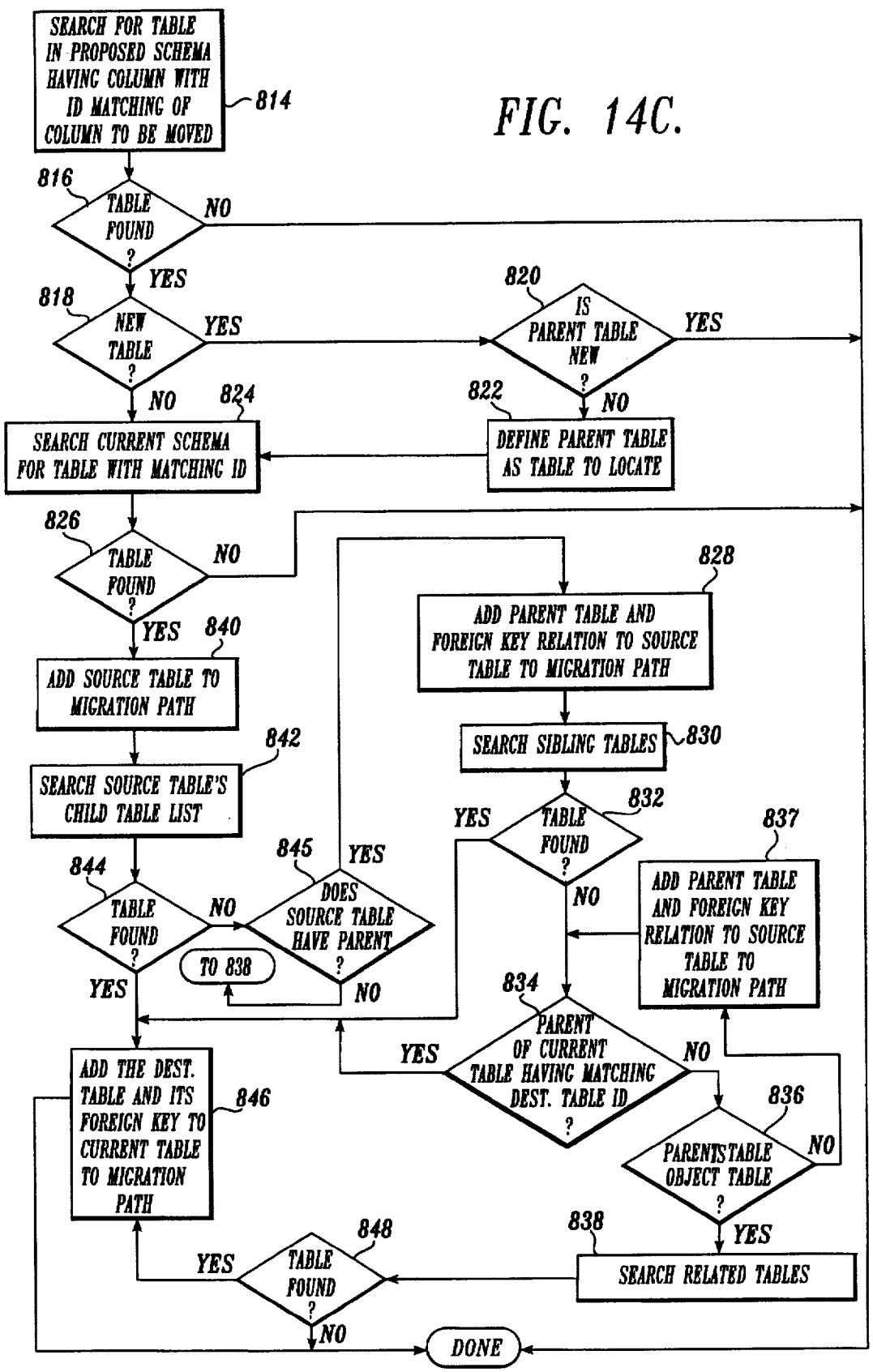

In order to support this extension, the migration path search would need to be modified as illustrated in FIG. 14C. The main difference is the migration path type is not available until the path is defined. The initial search in the proposed schema has to be performed without any supplemental information, i.e., all proposed tables have to be searched for a column having an ID that matches the source column ID. Once a table is found, a corresponding table with a matching table ID needs to be searched in the current schema. After the source and the destination tables in the current schema are successfully identified, a migration path needs to be defined to connect the two tables. If the destination table is new, its parent table should be searched. It is possible that the two are not related at all in the current schema resulting in no data migration. Starting from the source table, a search should be performed through its child tables (one-to-many), sibling tables (many-to-many), parent tables (many-to-one) or related object tables (one-to-one or many-to-one). The migration path type can then be found based upon the source cardinality and the path direction as indicated above.

FIG. 14C shows the steps performed by the present invention to extend the search for a column that has been moved in a sematic object model. Beginning with step 814, a search is performed in the proposed schema for a column having an ID that matches the ID of the column to be moved. As step 816, the computer system determines whether the table was found. If not, no data is migrated. If the answer to step 816 is yes, the computer system determines whether the table is newly created in the proposed schema. If so, processing proceeds to step 18 wherein the computer system determines whether the parent table of the table found in step 816 is new. If so, no data migration path is performed.

If the parent table in the proposed schema is not new, then the computer system defines the parent table as the table to be located as step 822. The computer system then searches the current schema for a table with a matching ID at step 824. At step 826, the computer system determines whether the table is found. If not, no data migration is performed. If the answer to step 826 is yes, meaning that the table was found in the current schema, then the computer system adds the source table to the migration path at step 840. At step 842, the computer system searches the source table's list of child tables (if any) for the destination table. At step 844, the computer system determines whether the destination table is found in any of the child tables of the source table. If not, then the computer system determines if the source table has a parent table and if so, then searches any sibling tables. If the source table has no parent, processing proceeds to step 838.

At step 828, the parent table and its foreign key relation to the source talbe are added to the migration path. At step 830, the computer searches the sibling tables through the parent tables' table list At step 832, the computer system determines whether the destination table is found. If not, the computer system begins a loop that searches for the destination table through the parent tables of the source table. An index, current table, is initialized as the source table and is reset to be each parent table's parent. At step 834, the computer system determines whether the parent table of the current table has an ID that matches the destination table. If not, the computer system determines at step 836 whether the parent table is associated with a sematic object in the object model. If not, the parent table and foreign key relation to the current table are added to the migration path at step 837. Processing then returns to step 834.

If the answer to step 836 is yes, the computer system searches any related object tables. At step 848, the computer system determines whether the destination table is found in any of the related object tables. If not, the migration path is complete. If the answer to step 848 is yes, then the computer system adds the destination table and its foreign key relation to the current table to the migration path. If the destination table was found in the current table's list of child tables, in a sibling table, or in any of the parent tables, then the computer system adds the destination table and its foreign key relation to the current table to the migration path in step 846.

Referring now to FIG. 14B, the steps performed by the computer system to compute the migration path for link type migrations are shown. Beginning at a step 770, the computer begins a loop that analyzes each DMForeignData instance having a DataType member variable equal to "link." The computer first determines whether the migration is a one-to-one type (step 772). If so, the computer adds the source table to the migration path at step 774. Next the computer searches the current schema for a table having a table_Id that is the same as the destination table_Id at step 776. The destination table is then added to the migration path along with the foreign key relation between the source and destination table at step 778.

If the migration type is not one-to-one, the computer then determines whether the migration is a many-to-one type at step 782. If so, the computer searches the current schema for the table having the same table_Id as the destination table and adds the destination table to the migration path at step 784. At step 786, the computer adds the source table and the foreign key relation between the source table and the destination table to the migration path. At step 788, the parent table of the source table is added to the migration path along with its foreign key information. The computer then determines whether the parent table represents an object in the object model at step 790. If so, the migration path is complete. If not the computer returns to step 788 and adds the parent table of the parent table to the migration path along with the foreign key information.

If the migration type was not one-to-one or many-to-one, the computer determines if the migration is a replace type at step 792. If so, the computer adds the source table to the migration path at step 794. Next, the computer adds the parent table of the source table as well as the foreign key information to the migration path and searches the current schema for a child table having the same table_Id as the destination table_Id at step 798. At step 804, the computer determines whether the child table was found. If so, the migration path is complete. If not, the computer system determines if the parent table found in step 798 has its own parent table (step 806). If so, the computer proceeds as in the one-to-one link type migration set forth in steps 774, 776 and 778 (as represented by box 808). If the table does not represent an object, the computer returns to step 798.

Finally, if the migration type is not one-to-one, many-to-one or replace, the computer knows the migration must be of type update. If so, the migration path is completed by adding the source table at step 810 and the destination table and its foreign key relation to the source at step 812.

Once the migration path is computed the computer assembles the SQL statements that when executed by the underlying database management system will modify the relational database to reflect the changes made in the object model.

Figure 15A:
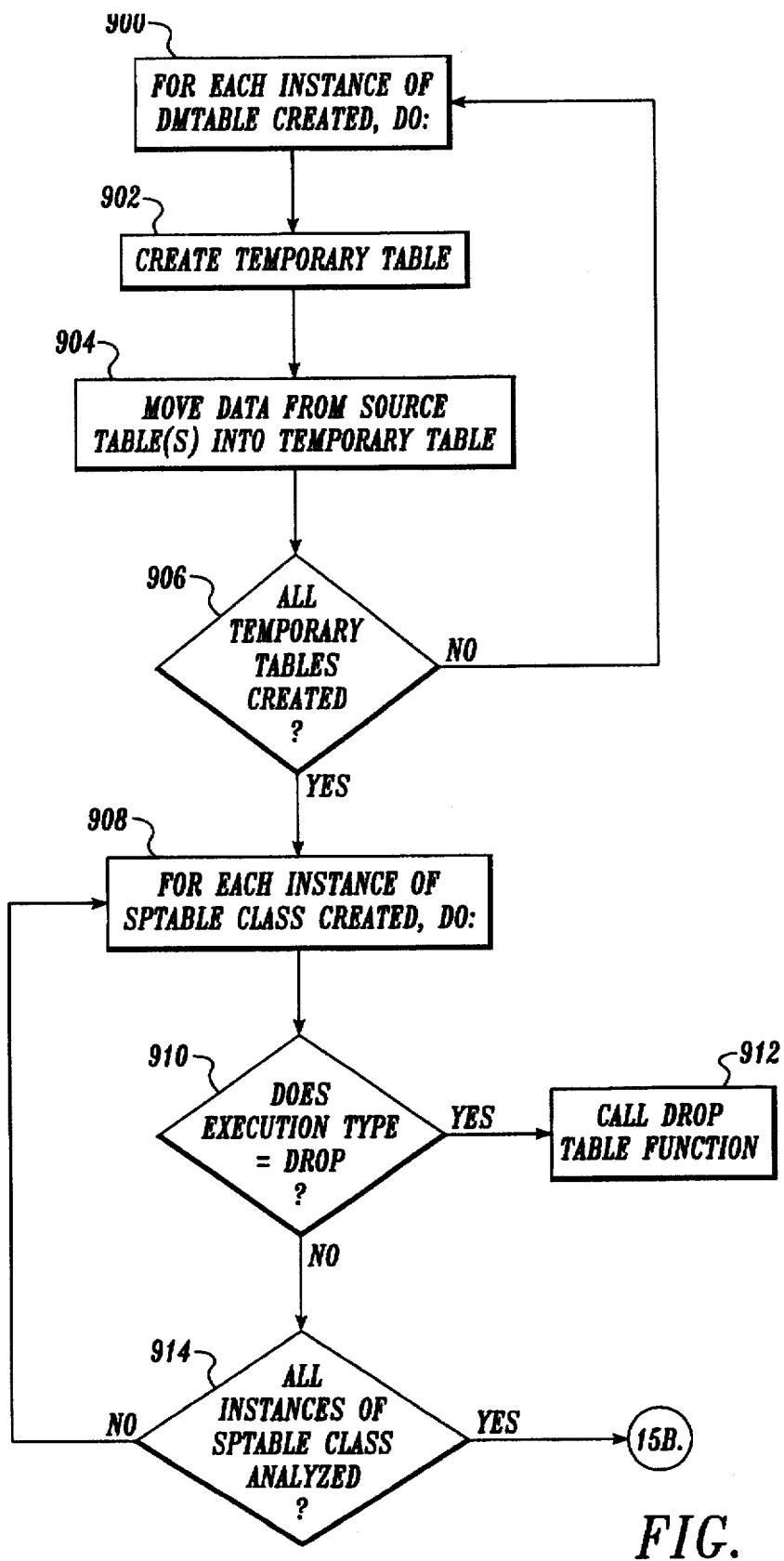
FIGS. 15A–15D are flow charts showing the steps performed by the present invention to modify an existing relational database to reflect changes made in a corresponding object model.
Figure 15B:
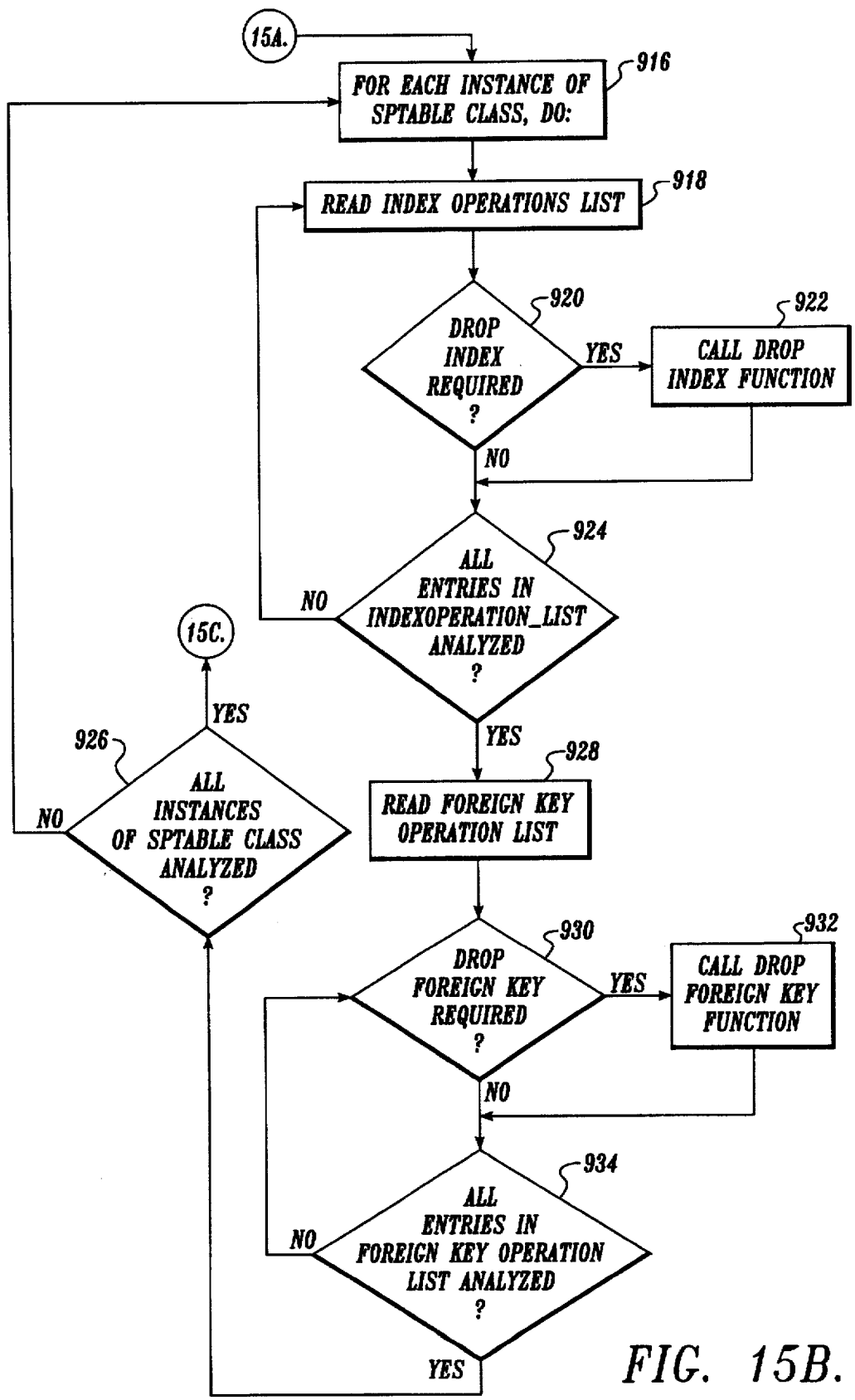

After having created and initialized instances of the SPTable, DMData and DMForeignData classes, the computer system modifies the tables of the existing relational database schema to reflect the changes made by a user to the corresponding object model. FIGS. 15A–15D show the steps performed by the computer system to modify the existing database schema. Referring to FIG. 15A, the computer system begins a loop that analyzes each instance of the DMTable class at step 900. At a step 902, the computer system creates a temporary table for each instance. At step 904, the computer system moves the data from the source table(s) into the temporary table. The loop ends at step 906 where the computer system determines if all the DMTable instances have been processed. If not, processing returns to step 900 and the next temporary table is created.

Once the temporary tables have been created, the computer system then begins a series of loops that analyze the instances of the SPTable class. As indicated above, the SPTable class informs the computer system of all the changes that must be performed on the existing tables in the database as well as creates new tables. Beginning at step 908 the computer system analyzes each instance of the SPTable class in the order the instances were placed in the ChangeTableList described above and shown in FIG. 11A. Next the computer system determines whether the execution type is set to "drop" (step 910). If so the computer system calls the drop table function for the class at step 912 and the table will be removed from the database. At a step 914, the computer system determines whether all instances of the SPTable class have been analyzed. If not, processing returns to step 908. Beginning at a step 916 (FIG. 15B) the computer begins a new loop that analyzes each instance of the SPTable class. At a step 918, the computer system reads the indexOperationList of the class. The computer then determines whether an entry in the list requires an index to be dropped at step 920. If so, the computer system calls the drop index function at step 922. Once the entire indexOperationList has been analyzed (see step 924), the computer system reads the foreignkeyOperationList at step 928. At step 930, the computer system determines whether the entry the list requires that a foreign key of a table be dropped. If so, the computer system calls the drop foreign key member function at step 932. At step 934, the computer determines whether all entries in the foreignkeyOperationList have been processed. If not, processing returns to step 928. After all the entries in the indexOperationList and foreignkeyOperationList have been processed, the computer system determines whether all the SPTable class instances have been processed at step 926. Processing returns to step 916 until all SPTable instances have been analyzed.

Figure 15C:
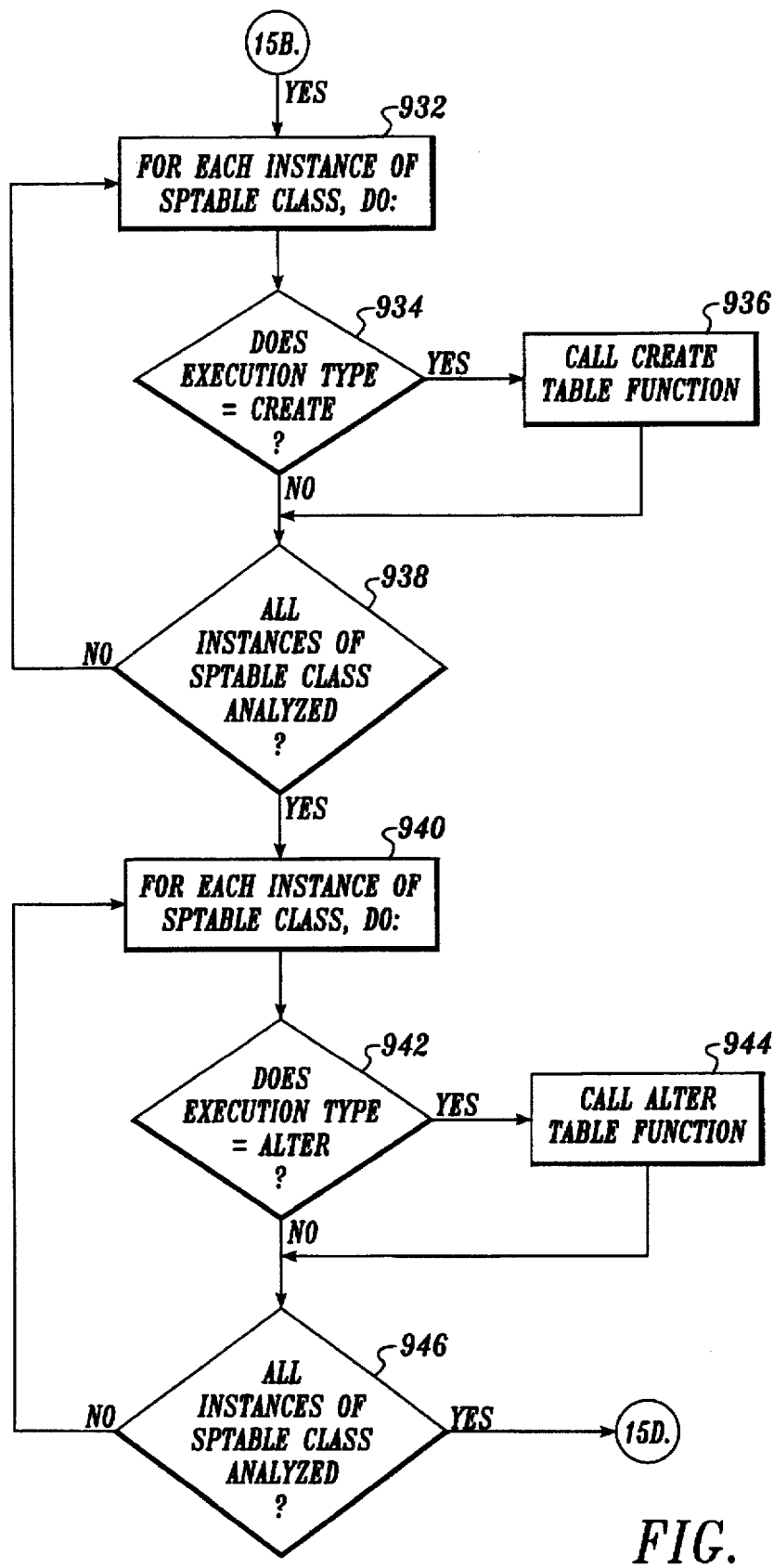

Turning now the FIG. 15C, the computer system then begins another loop to process each instance of the SPTable class. At step 934, the computer system determines whether the ExecutionType of the instance is equal to "create". If so, the computer system calls the create table function of the class at step 936. At step 938, it is determined if all the instance of the SPTable class have been analyzed. If not, processing returns to step 932.

Following step 938 the computer system begins another loop to analyze each instance of the SPTable class (see box 940). At step 942 the computer then determines whether the ExecutionType of the instance is "alter". If so the computer system calls the alter table function at step 944. Step 946 determines when each instance of SPTable class has been analyzed.

Figure 15D:
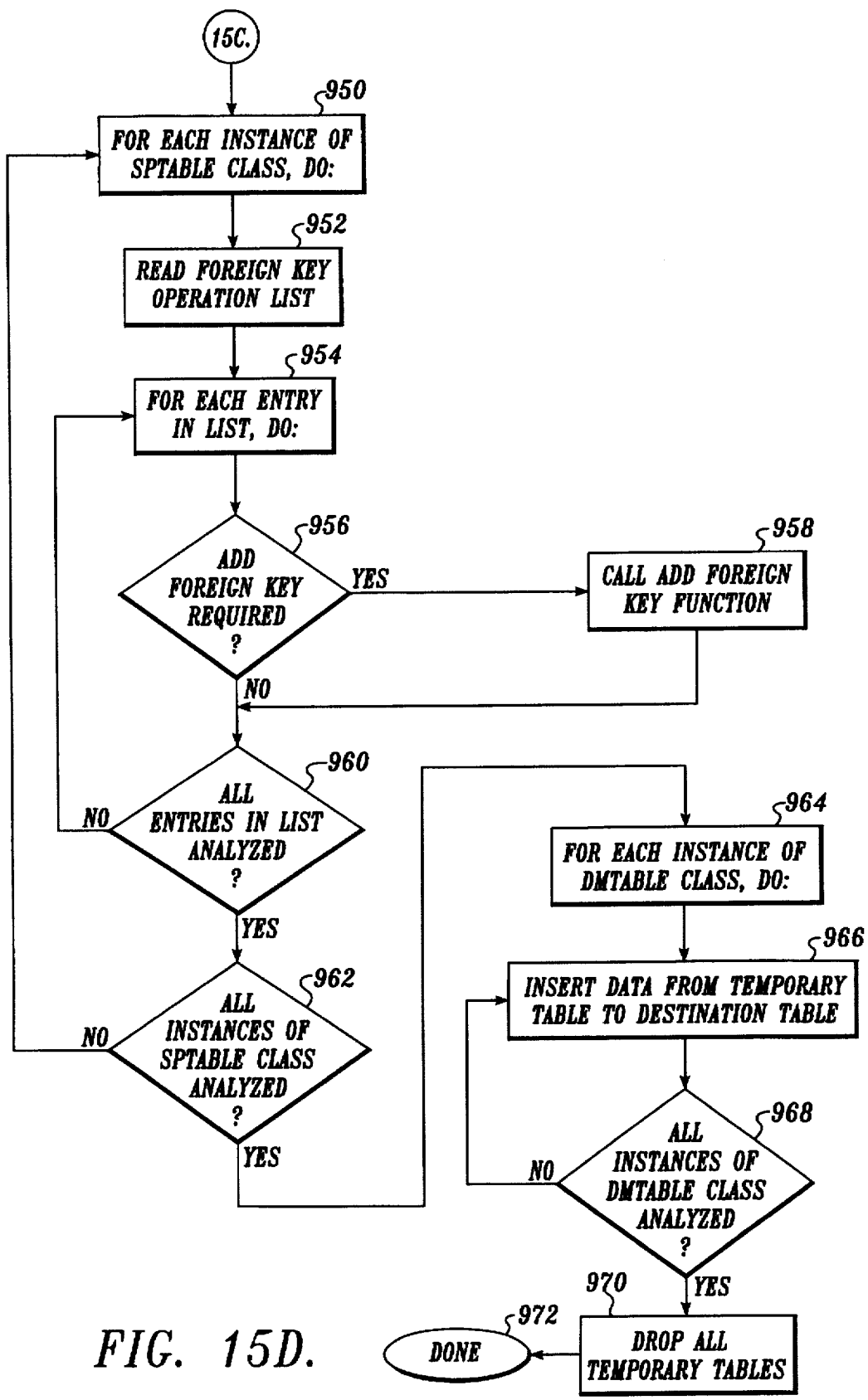

Turning now to FIG. 15D, the computer system begins a loop at step 950 to again analyze each SPTable instance. At step 952 the computer system reads the foreignkeyOperationList. The computer system then begins a loop at step 954 that determines if an entry in the foreignkeyOperationList requires a foreign key to be added to the table (step 956). If so, the computer system calls the add foreign key member function at step 958. At step 960, the computer system determines if all the entries in the foreignkeyOperation list have been analyzed. At step 962, the computer system determines whether all instances of the SPTable class have been processed. If not, processing returns to step 950.

After the SPTable classes have been analyzed as described above, the computer system begins a loop at step 964 that again processes each instance of the DMTable class. At step 966 the computer system then inserts the data from the temporary table created earlier into the destination table. Step 968 determines if each entry in the DMTable class has been processed and processing stops at step 970. Finally all temporary tables are dropped at step 970.

As described above at step 904 in FIG. 15A the computer operates to move data from the source tables into the temporary table defined by the DMDTable class instances. The following describes in greater detail how this is accomplished by the present invention.

Before executing the steps of FIGS. 15A–15D, each DMData or DMForeignData instance in the dataList for each DMTable instance is analyzed to create a SQL insert command that consists of the following four clauses:

| | |
|---|---|
| INSERT INTO | temporary table name (destination column names) |
| SELECT | source column names |
| FROM | destination table, source table names |
| WHERE | join conditions |

Once a temporary table has been created, a single SQL INSERT command is executed to populate the temporary table with data for the new destination table.

The INSERT and SELECT clauses of the SQL statement are simply obtained from each DMData or DMForeignData instance. The FROM and WHERE clauses are defined differently depending on a migration type and a specific migration path defined for each DMData or DMForeignData instance. The variations for the different value types of data migrations type are summarized below.

Value Type Migrations

ONE_TO_ONE

All source tables are simply joined with join conditions between the source tables and the destination table. The following example shows how three columns labeled "PK", "C1" and "C2" are moved from tables labeled "dstTable", "srcTable1" and "scrTable2" into a temporary table labeled "tempTable". In this example, the column labeled "FK1" from the table srcTable1 and "FK2" from the table srcTable2 are foreign keys to the PK column in the table dstTable.

| | |
|---|---|
| INSERT INTO | tempTable(PK, C1, C2) |
| SELECT | dstTable.PK, srcTable1.C1, srcTable2.C2 |
| FROM | srcTable1, srcTable2, dstTable |
| WHERE | srcTable1.FK1=dstTable.PK |
| AND | srcTable2.FK2=dstTable.PK; |
| ONE_TO_MANY | |

In the one-to-many value type data migration case, the SQL statements required to move a column of data from the source table to a destination table are more complex. If the computer has determined that the destination table does not exist in the current schema, then it is necessary to create a new table having a surrogate key. To do this, two temporary tables are created. The first temporary table (keyTable in the example below) has one column that holds sequential values for surrogate keys. To create the first temporary table, the computer executes an SQL statement similar to the statement:

| CREATE TABLE | keyTable( PK int );. |
|---|---|

Sequential surrogate key values are then repeatedly added to the first temporary table using the SQL statement:

| INSERT INTO | keyTable( PK ) |
|---|---|
| VALUES | (?); where "?" is an integer number. |

For each iteration, the computer system generates a unique integer value (denoted here by the question mark) and inserts the integer into the first temporary table as a surrogate key. The computer system executes the above INSERT statement until the number of entries equals the number of records in the source table to be migrated.

Because the current standard SQL syntax does not support selecting a row by a row number, the second temporary table (pkTable) and a view are utilized. The second temporary table is created and copies of the primary key values associated with non-null entries in the column (C1 in the example) to be migrated from the source table srcTable1 are copied into the second temporary table using the following SQL statement.

| CREATE TABLE | pkTable( PK type ); where "type" is the data type of the primary key |
|---|---|
| INSERT INTO | pkTable( PK ) |
| SELECT | srcTable1.PK |
| FROM | srcTable1 |
| WHERE | srcTable.C1 IS NOT NULL; |

A view is then created on the second temporary table to select a single primary key value by finding a minimum value of the primary key column using a SQL standard function Min(). However, those skilled in the art of database programming will recognize that the standard function Max() could also be used.

| CREATE VIEW | minPKView( PK ) |
|---|---|
| ON SELECT | Min( PK ) |
| FROM | pkTable; |

Once the view has been completed, the computer system creates a third temporary table (tempTable) that will be used as the template for the modified destination table.

After the third temporary table has been declared, the computer system begins a loop that inserts an entry from the column C1 in the source table that contains the data to be migrated, the primary key of the source table that is used as a foreign key and a surrogate key value that form the primary key of the third temporary table. The following is an example of the SQL statement that completes these steps. The "?" in the WHERE clause is replaced by an integer number as the statement is executed. The value is then incremented for the next insert.

| INSERT INTO | tempTable(C1, FK, PK) |
|---|---|
| SELECT | srcTable1.C1, srcTable1.PK, keyTable.PK |
| FROM | srcTable1, keyTable, minPKView |
| WHERE | keyTable.key=? |
| AND | srcTable1.PK=minPKView.PK; |

After inserting each row, a corresponding row in the "pkTable" is deleted. This process is repeated until the pkTable becomes empty. All temporary tables and views are then dropped from the database.

If the destination table already exists in the current database schema, the SQL required move a column C1 from a source table "srcTable1" to the temporary table "tempTable" simplifies to:

| INSERT INTO | tempTable( FK, PK, C1 ) |
|---|---|
| SELECT | dstTable.FK, dstTable.PK, srcTable1.C1 |
| FROM | dstTable, srcTable1 |
| WHERE | srcTable1.PK=dstTable.FK |

After the table "tempTable" has been set up, the entire table is then copied into the destination table and the temporary table can be dropped.

MANY_TO_ONE

Many-to-one value migrations occur as result of a cardinality change in a component from multi-valued to single-valued. To reflect this change in the database, it will often be necessary to delete data. The question becomes which data value will be copied from the source table to the destination table and which data values will be thrown away. As a default, the present embodiment of the invention always selects the record having a minimum primary key as the record to be saved.

To accomplish the data migration, a database view of the source table's primary key is created. Because the migration path may include multiple tables, it is necessary to specify all foreign key relations between the source table and the destination table. Therefore, the view is constructed to enclose the entire migration path using an SQL statement having the following form:

| CREATE VIEW | | pkView(FK, minPK) |
|---|---|---|
| ON | SELECT | T1.FK, Min(srcTable.PK) |
| | FROM | T1,T2, . . ., Tn, srcTable |
| | WHERE | T1.PK = T2.FK |
| | | . . . |
| | AND | Tn.PK = srcTable.FK |
| | GROUP BY | T1.FK; | where T1 . . . Tn are the tables in the migration path excluding the destination table.

After the view has been defined, the computer system executes an INSERT SQL command to add the selected records to the destination table. Using this view, the INSERT command will be the following:

| INSERT INTO | tempTable(PK, C1, C2) |
|---|---|
| SELECT | dstTable.PK, srcTable1.C1, dstTable.c2 |
| FROM | srcTable1, dstTable, pkView |
| WHERE | srcTable1.PK = pkView.minPK |
| AND | dstTable.PK = pkView.FK; |

After executing the above SQL command, the "pkView" needs to be dropped to complete the insert operation.

MANY_TO_MANY

A many-to-many type data migration is in effect a merging of two sets of data. Therefore, it is necessary to associate records from both the source and destination table in some way. As a default operation, the present invention uses a simple Cartesian product per parent instance as follows:

| | |
|---|---|
| INSERT INTO | tempTable(FK, PK, C1, C2, PK2) |
| SELECT | srcTable.FK, srcTable.PK, srcTable.C1, dstTable.C2, dstTable.PK |
| FROM | srcTable, dstTable |
| WHERE | srcTable.FK=dstTable.FK |

The merged table has new records created because of the Cartesian product resulting in duplicate primary key values. These duplicate values need to be reassigned new unique values.

In order to accomplish this task, a primary key from each source table is also copied into a temporary table. The combination of two (or more) primary key columns remains unique for selectively updating the surrogate key values of the destination table. The computer first creates the temporary table using the statement:

| | |
|---|---|
| CREATE TABLE | pkTable(FK int, PK int, PK2 type); | where "type" is the data type of the second primary key. Next the primary keys are inserted into the temporary table using the statement:

| | |
|---|---|
| INSERT INTO | pkTable(FK, PK, PK2) |
| SELECT | FK, PK, PK2 |
| FROM | tempTable; |

Two (or more depending on the number of tables associated) views are then created sequentially. The first view selects minimum values of the first primary key for each foreign key value, i.e., per parent record.

| | | |
|---|---|---|
| CREATE VIEW | | minPKView(FK, minPK) |
| ON | SELECT | FK, Min(PK) |
| | FROM | pkTable |
| | GROUP BY | FK; |

The second view then selects a minimum value of the second primary key for each minimum value of the first primary key.

| | | |
|---|---|---|
| CREATE VIEW | | minPKView2(minPK, minPK2) |
| ON | SELECT | minPK, Min(PKTable.PK2) |
| | FROM | minPKView, PKTable |
| | GROUP BY | minPK; |

The update is then performed by repeatedly executing the following two SQL commands with an integer number "?" incremented after each execution until the primary key table becomes empty. This key value is initialized to the maximum of the existing primary key value plus one.

| | | |
|---|---|---|
| UPDATE | tempTable | |
| SET | PK = ? | |
| WHERE | 1<(SELECT | COUNT(*) |
| | FROM minPKView2 | |
| | WHERE minPKView2.minPK = tempTable.PK | |
| | AND minPKView2.minPK2 = tempTable.PK2); | |
| DELETE FROM | pkTable | |
| WHERE | 1<(SELECT | COUNT(*) |
| | FROM minPKView2 | |

| | |
|---|---|
| | WHERE minPKView2.minPK = pkTable.PK |
| | AND minPKView2.minPK2 = pkTable.PK2); |

Link Type Migrations

When a foreign key is moved to another object table, the SQL insert command needs to be defined differently in order to copy the primary key values from the source table using the source foreign key data as a constraint. This again depends on the migration path of each DMForeignData instance. The following in an explanation of how each of the link type migrations are handled by the present invention.
ONE_TO_ONE In the case of a one-to-one migration, the source table primary key values are inserted as new foreign key values. The following SQL statement shows how the foreign key values found in a column labeled "FK" in a table "srcTable" are moved into a column "PK" in a destination table "dstTable".

| | |
|---|---|
| INSERT INTO | tempTable(PK, FK) |
| SELECT | dstTable.PK, srcTable.PK |
| FROM | dstTable, srcTable |
| WHERE | dstTable.PK=srcTable.FK |
| WHERE | |
| MANY_TO_ONE | |

As indicated above, many-to-one migrations often require that data in the database be deleted. Therefore, a view is created to reduce multiple records into one per other object instance using an SQL statement having the following form.

| | | |
|---|---|---|
| CREATE VIEW | | minPKView( dstFK, minPK) |
| ON | SELECT | dstFK, Min( srcObjTable.PK ) |
| | FROM | srcObjTable, . . . , Tn, srcTable |
| | WHERE | srcObjTable.PK = T1.FK |
| | AND | . . . |
| | AND | TN.PK = srcTable.FK |
| | GROUP BY | dstFK; |

Using the above view, the main INSERT command becomes as follows.

| | |
|---|---|
| INSERT INTO | tempTable( PK, FK ) |
| SELECT | dstTable.PK, srcTable.PK |
| FROM | dstTable, srcTable, minPKView |
| WHERE | srcTable.PK = minPKView.minPK |
| AND | dstTable.PK = minPKView.dstFK; |
| UPDATE | |

This migration type is utilized when an existing foreign key needs new values because of some changes in the primary key found in the referenced table. New key values are simply copied using the existing key constraints using an SQL statement having the form as set forth below where the FK is the name of the foreign key column and PK is the column holding the primary key values in the referenced table.

| | |
|---|---|
| INSERT INTO | tempTable( FK ) |
| SELECT | refTable.PK |
| FROM | srcTable, refTable |
| WHERE | srcTable.FK = refTable.PK; |
| REPLACE | |

This migration type is utilized when a foreign key is replaced by a new definition because of a change of a parent table, i.e., a component table is moved to another parent table. New key values are simply copied using the existing key constraints by executing an SQL statement having the form as set forth below where T1 ... TN are the tables found in the migration path computed above.

```
INSERT INTO    tempTable( FK )
SELECT         refTable.PK
FROM           srcTable, T1, ..., Tn, refTable
WHERE          srcTable.FK = T1.PK
AND            ...
AND            Tn.FK = refTable.PK
```

After the current database has been modified to reflect the changes made to the corresponding object model, the proposed schema is stored as the current schema to be used as a comparison to further object model changes.

As can be seen from the above description, the present invention operates to modify an existing database schema based upon changes made to a corresponding object model. The present invention allows users to easily update a database without having to understand such traditional relational database concepts such as tables, keys, foreign keys, surrogate keys, etc. It is believed that the present invention makes relational databases easier to use by persons having little or no relational database experience.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of modifying an existing relational database to reflect changes made in a corresponding object model, comprising the steps of:

storing an object model in the memory of a computer system which object model includes at least one object that represents a category of items about which data is stored in the relational database, the object including at least one component that defines the data stored in the relational database for the item;

displaying a visual representation of the object model;

storing a current relational database schema in the memory of the computer system, the current relational database schema defining one or more relational tables included in the existing relational database and one or more columns included in the one or more relational tables;

detecting modifications to the object model made by a user and automatically producing a proposed relational database schema corresponding to the modified object model; automatically comparing the current relational database schema and the proposed relational database schema; and automatically modify relational database based on the comparison of the current relational database schema and the proposed relational database schema without additional input from the user other than the modifications to the object model.

2. The method of claim 1, wherein the proposed relational database schema and the current relational database schema contain lists of relational database tables, wherein the step of comparing the proposed relational database schema and the proposed relational database schema further comprises the steps of:

automatically determining if each entry in the list of relational database tables in the current relational database schema is found in the list of relational database tables in the proposed schema; and automatically deleting from the relational database each table that is in the list of relational database tables in the current relational database schema but is not in the list of relational database tables in the proposed relational database schema.

3. The method of claim 2, further comprising the steps of:

automatically determining if there are any entries in the list of relational database tables in the proposed relational database schema that are not found in the list of relational database tables in the current relational database schema; and automatically adding a relational database table to the relational database for each entry that is in the list of relational database tables in the proposed relational database schema but is not in the list of relational database tables in the current relational database schema.

4. The method of claim 3, wherein the current relational database schema and the proposed relational database schema include a list of each column included in each table, wherein the step of comparing the proposed relational database schema and the proposed relational database schema further comprises the step of:

automatically determining if each entry in the list of columns included in a table within the current schema is found in the list of columns included in the table in the proposed schema; and automatically dropping from the relational database those columns that are included in the table in the current database schema but not in the table in the proposed database schema.

5. The method of claim 4, wherein if the computer system determines that a column is to be dropped from the relational database, the method further comprises the steps of:

automatically determining whether the column to be dropped from the relational database contains data and if so, to search the list of tables in the proposed relational database schema to determine if the column to be dropped has been moved to another table in the proposed relational database schema; and automatically moving the data from a source table in the relational database to a destination table in the relational database if the column to be dropped is found in another table in the proposed relational database schema.

6. The method of claim 5, wherein the step of moving the data from the source table to the destination table comprises the steps of:

automatically creating a temporary table in the relational database;

automatically moving the data into the temporary table;

automatically determining whether the destination table includes any data that is to be saved and if so, moving the data to be saved into the temporary table;

automatically dropping the destination table from the relational database;

automatically creating a new destination table that includes columns to hold the data that was to be saved and the data from the source table;

automatically moving the database from the temporary table into the new destination table; and automatically dropping the temporary table from the relational database.

7. The method of claim 5, wherein the step of moving the data from the source table to the destination table further comprises the steps of:

automatically determining a migration path between the source table and the destination table that is indicative of a foreign key relationship between the source table and the destination table.

8. The method of claim 1, wherein the relational database includes one or more tables that have foreign keys to other tables in the relational database, the method further comprising the steps of:

automatically creating a list in the memory of the computer that includes each table that is to be modified, wherein the entries in the list are arranged so that tables containing foreign keys to other tables in the database are modified after the tables to which the foreign keys refer.

9. A computer system for modifying a current relational database schema to reflect changes made to a corresponding object model that comprises at least one object that is representative of information stored in the relational database, each object including at least one component that is representative of data stored in the relational database comprising:

a processing unit;

a memory coupled to the processing unit;

a storage means for storing a current relational database schema;

a display that is driven by the central processing unit to produce a representation of the object model that corresponds to the current relational database schema, data entry means for allowing a user to modify the object model;

a set of programmed instructions disposed within the memory that causes the processing unit to analyze the modified object model and to automatically create a proposed relational database schema, the set of instructions further causing the central processing unit to automatically compare the proposed relational database schema with the current relational database schema and to automatically modify the current relational database schema to correspond to the modified object model without additional user input other than the modifications to the object model.

10. The computer system of claim 9, wherein the current relational database schema comprises a plurality of tables, each table having at least one column in which data is stored, wherein the set of instructions cause the computer system to produce a list within the memory that indicates an order in which the tables that comprise the current relational database schema are to be modified to correspond to the modified object model, wherein the list is arranged such that tables having foreign keys to other tables in the current relational database schema are modified after the tables to which the foreign keys refer.

11. The computer system of claim 9, wherein the proposed relational database schema and the current relational database schema contain lists of relational database tables, wherein the set of instructions cause to computer system to compare the proposed relational database schema and the proposed relational database schema by:

searching the list of relational database tables in the proposed and current database schemas to determine if any relational database tables that are in the current relational database schema are not in the proposed relational database schema; and generating an SQL statement that will drop from the current relational database schema any relational database table that is in the current relational database schema but is not in the proposed relational database schema.

12. The computer system of claim 11, wherein the set of instructions further cause to computer system to compare the proposed relational database schema and the proposed relational database schema by:

searching the list of relational database tables in the proposed and current database schemas to determine there are any relational database tables in the proposed relational database schema that are not found in the list of relational database tables in the current relational database schema; and generating an SQL statement that adds a relational database table to the current relational database schema for each relational database tables in the proposed relational database schema but not in the current relational database schema.

13. The computer system of claim 11, wherein current relational database schema and the proposed relational database schema include a list of each column included in each relational database table, wherein the set of instructions further cause the computer system to compare the proposed relational database schema and the proposed relational database schema by:

searching the list of columns for each table in the current relational database schema and the proposed relational database schema to determining if there are any colas included in a relational database table in the current database schema that are not found in relational database table in the proposed relational database schema; and generating an SQL statement that drops from the current relational database schema those columns that are included in the table in the current relational database schema but not in the table in the proposed relational database schema.

14. The computer system of claim 13, wherein the set of instructions cause the computer system to operate by:

determining whether the column to be dropped from the database contains data and if so, searching the some of the relational database tables in the proposed relational database schema to determine if the column has been moved to another table in the proposed relational database schema; and generating an SQL statement that when executed by the computer system moves the data from a source table in the relational database to a destination table in the relational database if the column to be dropped is found in another table defined in the proposed relational database schema.

15. The computer system of claim 14, wherein the set of instructions cause the computer system to generating a series of SQL statements that will:

create a temporary table in the relational database;

move the database into the temporary table;

determine whether the destination table includes any data that is to be saved and if so, moving the data to be saved into the temporary table;

drop the destination table from the relational database;

create a new destination table that includes columns to hold the data that was to be saved and the data from the source table;

move the database from the temporary table into the new destination table; and drop the temporary table from the relational database.

* * * * *

UNITED STATES PATENT AND TRADEMARK OFFICE
CERTIFICATE OF CORRECTION

PATENT NO. : 5,717,924
DATED : February 10, 1998
INVENTOR(S) : K. Kawai

It is certified that error appears in the above-indentified patent and that said Letters Patent is hereby corrected as shown below:

| COLUMN | LINE | |
|---|---|---|
| Item [57] | Abstract 10 of text | "relation" should read --relational-- |
| [56] Pg. 2, col. 2 | Refs. Cited (Other Publs., Item 13) | "Objec-t" should read --Object-- |
| 31 (Claim 1, | 55 line 23) | "modify" should read --modifying the-- |
| 32 (Claim 4, | 24 line 4) | "proposed" should read --current-- |
| 33 (Claim 11, | 58 line 4) | "cause to" should read --cause the-- |
| 33 (Claim 11, | 59 line 5) | "proposed" should read --current-- |
| 34 (Claim 12, | 5 line 2) | "cause to" should read --cause the-- |
| 34 (Claim 12, | 6 line 3) | "proposed" should read --current-- |
| 34 (Claim 12, | 6 line 6) | after "determine" insert --if-- |

UNITED STATES PATENT AND TRADEMARK OFFICE
CERTIFICATE OF CORRECTION

PATENT NO. : 5,717,924
DATED : February 10, 1998
INVENTOR(S) : K. Kawai

Page 2 of 2

It is certified that error appears in the above-indentified patent and that said Letters Patent is hereby corrected as shown below:

| COLUMN | LINE | |
|---|---|---|
| 34 (Claim 12, | 16 line 13) | "tables" should read --table-- |
| 34 (Claim 13, | 27 line 10) | "determining" should read --determine-- |
| 34 (Claim 13, | 27 line 10) | "colas" should read --columns-- |
| 34 (Claim 14, | 40 line 4) | after "searching" delete "the" |
| 34 (Claim 15, | 52 line 2) | "generating" should read --generate-- |

Signed and Sealed this

Fifteenth Day of September, 1998

Attest:

BRUCE LEHMAN

Attesting Officer

Commissioner of Patents and Trademarks